(12) United States Patent  (10) Patent No.: US 7,803,455 B2
Taka et al.  (45) Date of Patent: Sep. 28, 2010

(54) OPTICAL ELEMENT AND OPTICAL PICKUP APPARATUS

(75) Inventors: Kunihiko Taka, Musashino (JP); Tatsuo Ohta, Otsuki (JP); Katsuya Nakamura, Kanagawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 1026 days.

(21) Appl. No.: 11/495,570

(22) Filed: Jul. 31, 2006

(65) Prior Publication Data

US 2007/0035840 A1 Feb. 15, 2007

(30) Foreign Application Priority Data

Aug. 3, 2005 (JP) ............................. 2005-225406

(51) Int. Cl.
*G02B 1/11* (2006.01)
*B32B 7/02* (2006.01)

(52) U.S. Cl. .................. 428/216; 359/355; 359/581; 359/586; 359/719; 359/722; 428/451

(58) Field of Classification Search ................ 428/216, 428/451; 359/355, 581, 719, 722
See application file for complete search history.

(56) References Cited

U.S. PATENT DOCUMENTS 7,161,744 B2 * 1/2007 Ohta et al. .................. 359/719

* cited by examiner

*Primary Examiner*—D. S Nakarani
(74) *Attorney, Agent, or Firm*—Finnegan, Henderson, Farabow, Garrett & Dunner LLP

(57) ABSTRACT

The present invention provides an optical element including: a substrate; and an antireflection film formed on a surface of the substrate. The antireflection film includes a plurality of lower refractive index layers, and a plurality of higher refractive index layers which are layered alternately. Each of at least two of the plurality of lower refractive index layers comprises a same main component each other and comprises a side component with a different content ratio independently.

17 Claims, 10 Drawing Sheets

OPTICAL ELEMENT AND OPTICAL PICKUP APPARATUS

This application is based on Japanese Patent Application No. 2005-225406 filed on Aug. 3, 2005 in Japanese Patent Office, the entire content of which is hereby incorporated by reference.

TECHNICAL FIELD

The present invention relates to an optical element which includes an antireflection film and an optical pickup apparatus using the optical element.

BACKGROUND

Conventionally, examples of optical pickup apparatus include devices for recording and reproducing information using information recording media such as CDs which use light flux with wavelength of about 780 nm or DVDs which use light flux with wavelength of about 635-650 nm. The optical pickup apparatus records or reproduces information by passing a light flux emitted from a light source through an optical element such as collimator lens or objective lens and converging the light flux on the recording surface of the information recording medium.

In recent times, high density DVDs used with light flux with wavelength of about 405 nm, such as AOD (Advanced Optical Disc) or Blu-ray discs have been developed as the information recording medium used in these optical pickup apparatus.

In the optical pickup apparatus that corresponds to the high density DVD, by forming the antireflection film of the optical element by laminating plural lower refractive index layers and plural higher refractive index layers, the light stability of the optical element is improved. (See Japanese Patent Application Laid-Open No. 2005-11494 publication). In addition, in the optical pickup apparatus in which three types of information recording media which are CD, DVD and high density DVD are compatible, by forming the antireflection film by laminating plural lower refractive index layers and plural higher refractive index layers, reflection can be prevented for the light flux of each of the three wavelengths and the diameter of the converged spot can be reduced, and the balance in the amount of light transmitted can be kept favorable. (See Japanese Patent Application Laid-Open No. 2005-31361 publication).

However, in the antireflection film disclosed in the aforementioned Japanese Patent Application Laid-Open No. 2005-11494 publication and Japanese Patent Application Laid-Open No. 2005-31361 publication, because only layers which have the same composition is used for the lower refractive index layer, of the film stress on the antireflection film due to changes in environmental conditions such as temperature and humidity, repeated film stress on the lower refractive index layer sometimes cause cracking and peeling in the antireflection layer. That is to say the antireflection film has poor environmental stability.

An object of the present invention is to provide an optical element and optical pickup apparatus which has better environmental stability than those of the prior art.

SUMMARY

The optical element according to the present invention is provided with: a substrate and an antireflection film that is formed on the surface of the substrate. The antireflection film includes a plurality of lower refractive index layers and a plurality of higher refractive index layers. The plurality of lower refractive index layers and plurality of higher refractive index layers are layered alternately and at least two of the plurality of lower refractive index layers includes the same main component, and includes a side component with a different content ratio.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE PREFERRED EMBODIMENT

Figure 1:
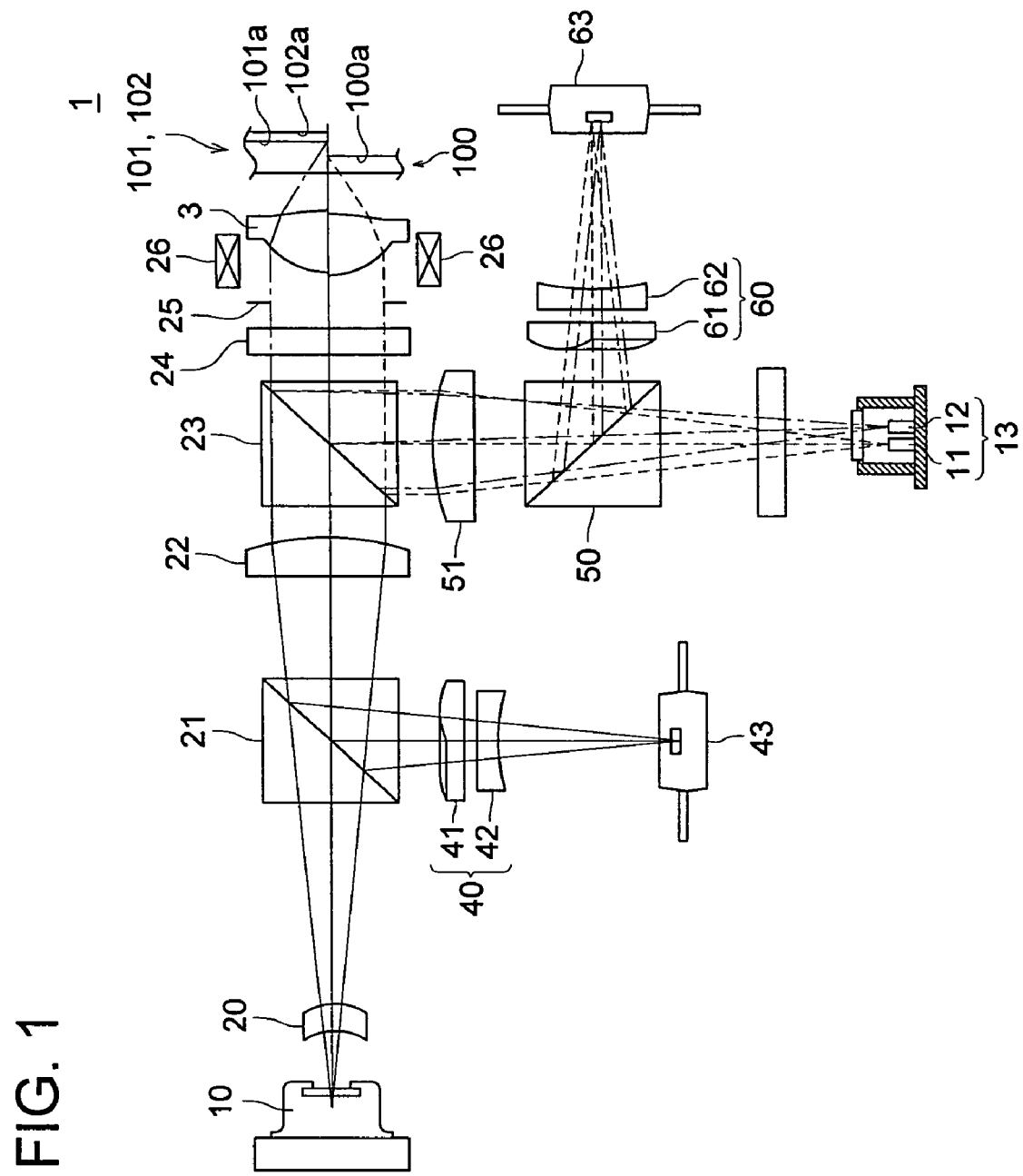
FIG. 1 shows a schematic structure of the optical pickup apparatus.

The preferred embodiment according to the present invention is described below.

Item 1 is an optical element provided with: a substrate; and an antireflection film formed on a surface of the substrate. The antireflection film includes a plurality of lower refractive index layers having a refractive index equal to or more than 1.4 and equal to or less than 1.6 for a light flux with a wavelength of 450 nm, and a plurality of higher refractive index layers having a refractive index equal to or more than 1.8 and equal to or less than 2.2 for a light flux with a wavelength of 450 nm. The plurality of lower refractive index layers and the plurality of higher refractive index layers are layered alternately. Each of at least two of the plurality of lower refractive index layers comprises a same main component each other and comprises a side component with a different content ratio independently.

In the present specification, a main component means a component whose content ratio is 80% or more.

Furthermore, "two of the plurality of lower refractive index layers comprises a side component with a different content ratio independently" means, for example, that the content ratio difference of the side component between the two lower refractive index layers is 1% or more, and it includes two lower refractive index layers in which one lower refractive index layers has a content ratio more than 0% and the other lower refractive index layers has a content ratio of 0%.

Item 2 is the optical element described in Item 1 in which the optical element is arranged on an optical path of an optical pickup apparatus for recording and/or reproducing information using a light flux emitted by a light source.

Item 3 is the optical element described in Item 2 in which the optical element converges at last a light flux with a single wavelength in a range of 350 nm to 450 nm on an information recording medium.

Item 4 is the optical element described in any one of Items 1 to 3 in which at least a couple of the lower refractive index layers comprising a same main component each other and comprising a side component with a different content ratio independently are arranged at either side of one of the plurality of higher refractive index layers.

Item 5 is the optical element described in any one of Items 1 to 4 in which each of the plurality of lower refractive index layers adjoins one side of one of the plurality of higher refractive index layers, comprises a same main component as a lower refractive index layer adjoining the other side of the higher refractive index layer, and further comprises a side component with a different content ratio from the lower refractive index layer adjoining the other side of the higher refractive index layer.

Item 6 is the optical element described in any one of Items 1 to 5 in which the main component is silicon dioxide.

Item 7 is the optical element described in any one of Items 1 to 6 in which the side component is aluminum oxide.

Item 8 is the optical element described in any one of Items 1 to 7 in which each of the plurality of the higher refractive index layers comprises a substance or a mixture of substances selected from a group consisting of: hafnium oxide, zirconium oxide, titanium oxide, magnesium oxide, lanthanum oxide, zirconium titanate, tantalum oxide, silicon oxide, thorium oxide, yttrium oxide, praseodymium oxide, and scandium oxide.

Item 9 is the optical element described in Item 8 in which each of the plurality of the higher refractive index layers comprises zirconium oxide.

Item 10 is the optical element described in any one of Items 1 to 9 in which the antireflection layer is formed of 7, 8 or 9 layers.

Item 11 is the optical element described in any one of Items 1 to 10 in which the antireflection layer is provided with: a first layer arranged at a closest position to the substrate and having a layer thickness in a range of 100 nm to 130 nm; a second layer arranged at a second closest position to the substrate and having a layer thickness in a range of 10 nm to 14 nm; a third layer arranged at a third closest position to the substrate and having a layer thickness in a range of 28 nm to 36 nm; a fourth layer arranged at a fourth closest position to the substrate and having a layer thickness in a range of 46 nm to 60 nm; a fifth layer arranged at a fifth closest position to the substrate and having a layer thickness in a range of 13 nm to 17 nm; a sixth layer arranged at a sixth closest position to the substrate and having a layer thickness in a range of 44 nm to 55 nm; and a seventh layer arranged at a seventh closest position to the substrate and having a layer thickness in a range of 75 nm to 95 nm.

Item 12 is the optical element described in any one of Items 1 to 10 in which the antireflection layer is provided with: a first layer arranged at a closest position to the substrate and having a layer thickness in a range of 85 nm to 105 nm; a second layer arranged at a second closest position to the substrate and having a layer thickness in a range of 11 nm to 15 nm; a third layer arranged at a third closest position to the substrate and having a layer thickness in a range of 30 nm to 38 nm; a fourth layer arranged at a fourth closest position to the substrate and having a layer thickness in a range of 54 nm to 68 nm; a fifth layer arranged at a fifth closest position to the substrate and having a layer thickness in a range of 20 nm to 25 nm; a sixth layer arranged at a sixth closest position to the substrate and having a layer thickness in a range of 34 nm to 43 nm; and a seventh layer arranged at a seventh closest position to the substrate and having a layer thickness in a range of 85 nm to 108 nm.

Item 13 is the optical element described in any one of Items 1 to 10 in which the antireflection layer is provided with: a first layer arranged at a closest position to the substrate and having a layer thickness in a range of 100 nm to 130 nm; a second layer arranged at a second closest position to the substrate and having a layer thickness in a range of 13 nm to 17 nm; a third layer arranged at a third closest position to the substrate and having a layer thickness in a range of 42 nm to 52 nm; a fourth layer arranged at a fourth closest position to the substrate and having a layer thickness in a range of 50 nm to 63 nm; a fifth layer arranged at a fifth closest position to the substrate and having a layer thickness in a range of 13 nm to 17 nm; a sixth layer arranged at a sixth closest position to the substrate and having a layer thickness in a range of 52 nm to 65 nm; and a seventh layer arranged at a seventh closest position to the substrate and having a layer thickness in a range of 85 nm to 108 nm.

Item 14 is the optical element described in any one of Items 1 to 10 in which the antireflection layer is provided with: a first layer arranged at a closest position to the substrate and having a layer thickness in a range of 80 nm to 100 nm; a second layer arranged at a second closest position to the substrate and having a layer thickness in a range of 10 nm to 14 nm; a third layer arranged at a third closest position to the substrate and having a layer thickness in a range of 46 nm to 58 nm; a fourth layer arranged at a fourth closest position to the substrate and having a layer thickness in a range of 10 nm to 14 nm; a fifth layer arranged at a fifth closest position to the substrate and having a layer thickness in a range of 14 nm to 18 nm; a sixth layer arranged at a sixth closest position to the substrate and having a layer thickness in a range of 33 nm to 42 nm; a seventh layer arranged at a seventh closest position to the substrate and having a layer thickness in a range of 27 nm to 35 nm; a eighth layer arranged at a eighth closest position to the substrate and having a layer thickness in a range of 35 nm to 45 nm; and a ninth layer arranged at a ninth closest position to the substrate and having a layer thickness in a range of 94 nm to 117 nm.

In the present specification, a layer thickness means a thickness of a layer measured on the optical axis of the optical element.

Item 15 is the optical element described in any one of Items 1 to 14 in which the substrate comprises a resin composition includes a resin comprising a copolymer of an α-olefin and a cyclic olefin; and a light stabilizer. The cyclic olefin is represented by general formula (I) or general formula (II), where, in the general formula (I), n is 0 or 1, m is 0 or a positive integer, k is 0 or 1, and each of $R^1$ to $R^{18}$, $R^a$, and $R^b$ independently represents hydrogen atom, halogen atom, or hydrocarbon group and where, in the general formula (II), each of p and q is 0 or a positive integer independently, each of r and s is one of 0, 1 and 2 independently, each of $R^{21}$ to $R^{39}$ represents independently hydrogen atom, halogen atom, hydrocarbon group, or alkoxy group.

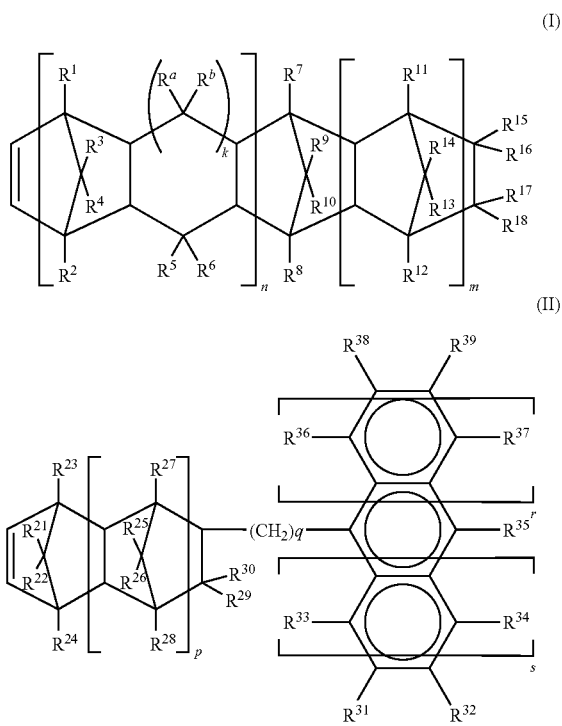

Item 16 is the optical element described in Item 15 in which the light stabilizer is a hindered amine light stabilizer.

Item 17 is an optical pickup apparatus provided with: a first light source for emitting a first light flux; an objective lens for converging the first light flux emitted from the first light flux to an information recording medium; and an optical element arranged on an optical path of the first light flux. The optical element includes: a substrate and an antireflection film formed on a surface of the substrate. The antireflection film is provided with a plurality of lower refractive index layers having a refractive index equal to or more than 1.4 and equal to or less than 1.6 for a light flux with a wavelength of 450 nm, and a plurality of higher refractive index layers having a refractive index equal to or more than 1.8 and equal to or less than 2.2 for a light flux with a wavelength of 450 nm. The plurality of lower refractive index layers and the plurality of higher refractive index layers are layered alternately, and each of at least two of the plurality of lower refractive index layers comprises a same main component each other and comprises a side component with a different content ratio independently.

Item 18 is the optical pickup apparatus described in Item 17 in which the optical element is the objective lens.

Item 19 is the optical pickup apparatus described in Item 17 or 18 in which the first light source emits a light flux with a single wavelength in a range of 350 nm to 450 nm.

Each of embodiments described in Item 1 to 19 provides an optical element and optical pickup apparatus with enhanced environment resistance comparing to conventional embodiments.

While the preferred embodiments of the present invention have been described using specific terms, such description is for illustrative purposes only, and it is to be understood that changes and variations may be made without departing from the sprit or scope of the appended claims.

The following is a description of an embodiment according to the present invention with reference to the drawings.

FIG. 1 is a cross-sectional view which shows the schematic structure of the optical pickup apparatus 1.

As shown in FIG. 1, the optical pickup apparatus 1 comprises 3 types of laser light sources 10, 11 and 12 which are the light sources in the present invention.

When information is recorded/reproduced with BD (Blu-ray disc) 100 as the information recording medium, the laser source 10 emits a light flux with a specific wavelength (such as 405 nm or 407 nm) within the 350-450 nm wavelength range. It is to be noted that in this embodiment, the thickness of the protective layer BD 100 is 0.1 mm.

When information is recorded/reproduced with DVD 101 as the information recording medium, the laser light source 11 emits a light flux with a specific wavelength (such as 655 nm) within the 620-680 nm wavelength range and this is combined with the laser light source 12 to form the laser light source 13. It is to be noted that in this embodiment, the thickness of the protective layer DVD 101 is 0.6 mm. Also, in this specification, DVD refers to DVD based information recording media such as DVD-ROM, DVD-Video, DVD-Audio, DVD-RAM, DVD-R, DVD-RW, DVD+R and DVD+RW.

When information is recorded/reproduced with CD 102 as the information recording medium, the laser light source 12 emits a light flux with a specific wavelength (such as 785 nm) within the 750-810 nm wavelength range. It is to be noted that in this embodiment, the thickness of the protective layer CD 102 is 1.2 mm. Also, in this specification, CD refers to CD based information recording media such as CD-ROM, CD-Audio, CD-Video, CD-R and CD-RW.

The beam shaper 20, the beam splitter 21, the collimator lens 22, the beam splitter 23, the ¼ wavelength plate 24, the diaphragm 25, and the objective lens 3 are sequentially arranged from the lower side to the upper side of FIG. 1 in the optical axis direction of the light flux that is emitted from the laser light source 10. The objective lens 3 has a secondary actuator which moves the objective lens in the vertical direction in FIG. 1. The BD 100, DVD 101 or the CD 102 is disposed as the information recording medium at the position opposing the objective lens 3.

The sensor lens 40 and the optical detector 43 are sequentially arranged at the right side in FIG. 1 with respect to the beam splitter 21. The sensor lens 40 comprises the cylindrical lens 41 and the concave lens 42.

The beam splitter 50, the collimator lens 51, and the beam splitter 23, are sequentially arranged from the right to left in FIG. 1, in the optical axis direction of the light flux that is emitted from the laser light sources 11 and 12 from the lower side to the upper side of FIG. 1. The sensor lens 60 and the optical detector 63 are sequentially arranged above the beam splitter 50 in FIG. 1. The sensor lens 60 comprises the cylindrical lens 61 and the concave lens 62.

Next, the operation and effects of the optical pickup apparatus 1 will be briefly described. When recording information on BD 100 or reproducing the information from BD 100, the laser light source 10 emits light flux. As shown by the light beam path of the solid line in FIG. 1, the light flux first passes through the beam shaper 20 and is shaped, and after it passes through the beam splitter 21, it is converted to parallel light in the collimator lens 22. Next, the light flux passes through the beam splitter 23 and the ¼ wavelength plate 24 and is collimated at the diaphragm 25 and then focused by the objective lens 3 and then forms a converged spot on the information recording surface 100a of the BD 100. At this time, objective lens 3 performs focusing operation or tracking operation using the secondary actuator 26 which is disposed in the vicinity thereof.

Next, the beam formed in a converged spot is modulated using information bits on the information recording surface 100a of the BD 100 and reflected. The reflected beam is then passed through the objective lens 3, the ¼ wavelength plate 24, the beam splitter 23 and the collimator lens 22 and after being reflected at the beam splitter 21 and anastigmatized by the sensor lens 40, the reflected light reaches the optical detector 43. The information in the BD 100 is then reproduced using the output signals from the optical detector 43.

When recording information on DVD 101 or reproducing the information from DVD 101, the laser light source 11 emits a light flux. As shown by the light beam path of the dotted line in FIG. 1, the light flux first passes through the beam splitter 50 then is converted to parallel light in the collimator lens 51. Next, the light flux is reflected by beam splitter 23, passes through the ¼ wavelength plate 24 and is collimated at the diaphragm 25 and subsequently focused by the objective lens 3 and then forms a converged spot on the information recording surface 101a of the DVD 101. At this time, objective lens 3 performs focusing operation or tracking operation using the secondary actuator 26 which is disposed in the vicinity thereof.

Next, the beam formed in a converged spot is modulated using information pit on the information recording surface 101a of the DVD 101 and reflected. The reflected beam is then passed through the objective lens 3 and the ¼ wavelength plate 24 and after being reflected at the beam splitters 23 and 50 respectively the reflected beam is anastigmatized by the sensor lens 60, and then reaches the optical detector 63. The information in the DVD 101 is then reproduced using the output signals from the optical detector 63.

When recording information on CD 102 or reproducing the information on CD 102, the laser light source 12 emits a light flux. As shown by the light beam path of the double-dot chain line in FIG. 1, the light flux first passes through the beam splitter 50 then is converted to parallel light in the collimator lens 51. Next, the light flux is reflected by beam splitter 23, passes through the ¼ wavelength plate 24 and is collimated at the diaphragm 25 and subsequently focused by the objective lens 3 and then forms a converged spot on the information recording surface 102a of the CD 102. At this time, objective lens 3 performs focusing operation or tracking operation using the secondary actuator 26 which is disposed in the vicinity thereof.

Next the beam formed as the converged spot is modulated using information pit on the information recording surface 102a of the CD 102. The reflected beam is then passed through the objective lens 3, the ¼ wavelength plate 24, and after being reflected at the beam splitters 23 and 50 respectively the reflected beam is anastigmatized by the sensor lens 60, and then reaches the optical detector 63. The information on the CD 102 is then reproduced using the output signals from the optical detector 63.

Next, the structure of the objective lens 3 will be described.

The objective lens 3 is the optical element according to the present invention and has the function of converging the light flux emitted from the laser light sources 10, 11 and 12 onto the information recording surfaces 100a, 101a and 102a of the BD 100, the DVD 101 and the CD 102, respectively. It is to be noted that the aperture number NA is 0.85 for the light flux that is emitted from the laser light source 10; 0.65 for the light flux that is emitted from the laser light source 11; and 0.45-0.51 for the light flux that is emitted from the laser light source 12. Also, the refractive index of the objective lens 3 is 1.55.

Figure 2:
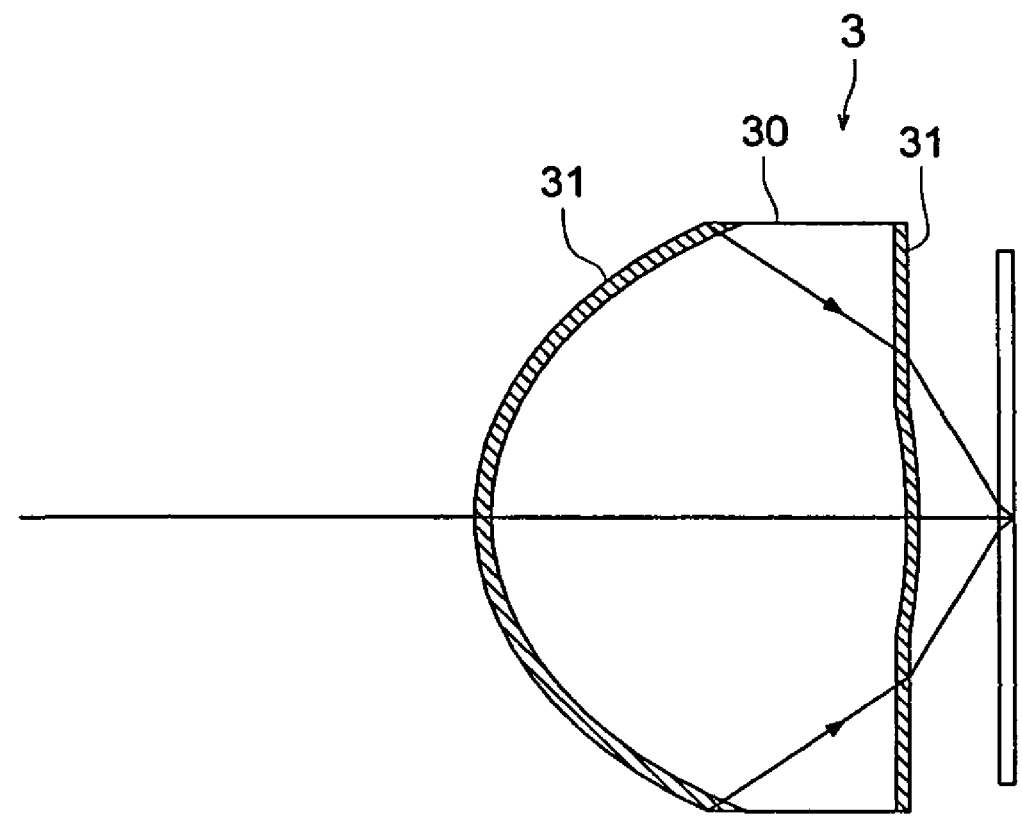
FIG. 2 is a cross-sectional view of the objective lens.

As shown in FIG. 2, the objective lens 3 is a single lens and includes one substrate 30.

Figure 3:
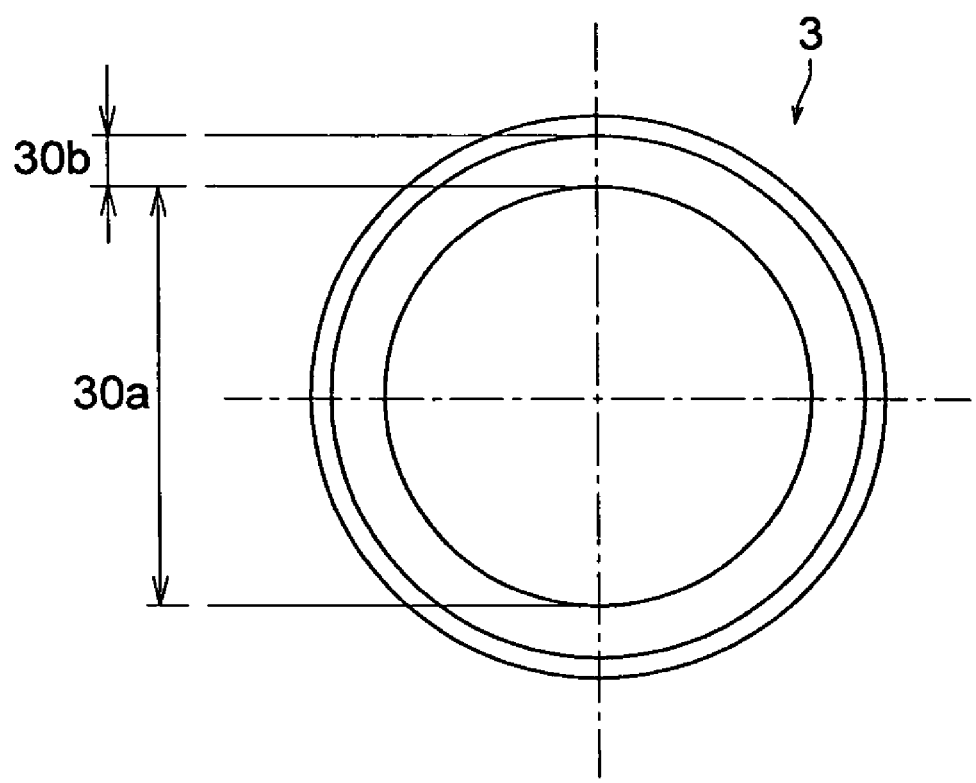
FIG. 3 shows an optical surface of the objective lens.

The substrate 30 has two optical surfaces which are aspherical surfaces. Between these two optical surfaces, as shown in FIG. 3, at least the light source-side optical surface is divided into a first region 30a and a second region 30b. The first region 30a is a region through which the light flux emitted from the laser light sources 10, 11 and 12 pass and the second region 30b is a region through which the light flux emitted from the laser light sources 10 and 11 pass. It is to be noted that the second region 30b is further divided into a region through which the two light fluxes from the laser light sources 10 and 11 pass and a region through which only the light flux emitted from the laser light source 11 passes.

The first region 30a has a diffractive structure (not shown) as a phase structure. The diffractive structure converges the light flux from the laser light sources 10, 11 and 12 onto the information recording surfaces 100a, 101a and 102a of each of the corresponding information recording media by generating optical path differences. The configuration of the diffractive structure can be a known configuration from the prior art. The diffractive structure of this embodiment is formed from multiple ring-shaped zones whose centers are at the optical axis and the cross sectional configuration which includes the optical axis, is a saw-tooth shape.

This type of substrate 30 is preferably formed from a resin composition which has excellent light stability and thermal stability with respect to short wavelength violet lasers. Examples of this resin composition are those including a resin formed from copolymers of α-olefin and cyclical olefin, and further including a light stabilizer, for example, "APEL" (commercial name) manufactured by Mitsui Chemicals, Inc.

The cyclical olefin is preferably represented by the following general formula (I) or (II).

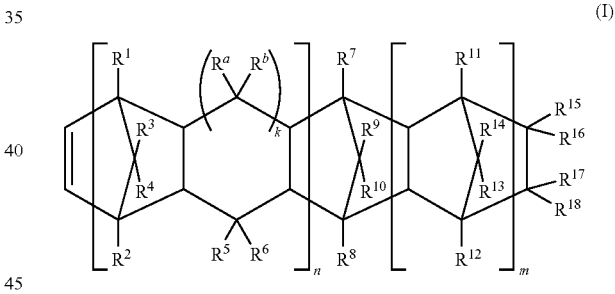

(I)

In the formula, n is 0 or 1, m is 0 or a positive integer, and k is 0 or 1. It is to be noted that in the case where k is 1, the ring that is shown using k has 6 member rings, while the ring has 5 member rings when k is 0.

$R^1$ to $R^{18}$ and $R^a$ and $R^b$ independently represent a hydrogen atom, a halogen atom or a hydrocarbon group. The halogen atom herein represents a fluorine atom, a chlorine atom, a bromine atom or an iodine atom.

Examples of the hydrocarbon group usually include an alkyl group having 1-20 carbon atoms, a halogenated alkyl group having 1-20 carbon atoms, a cycloalkyl group or an aromatic hydrocarbon group having 3-15 carbon atoms. More specifically, examples of the alkyl group include a methyl group, an ethyl group, a propyl group, an isopropyl group, an amyl group, a hexyl group, an octyl group, a decyl group, a dodecyl group and an octadecyl group. These alkyl groups may be substituted by a halogen atom.

An example of the cycloalkyl group is cyclohexyl and examples of the aromatic hydrocarbon include a phenyl group, a naphtyl group and the like. In addition in the general formula (I), $R^{15}$ and $R^{16}$, $R^{17}$ and $R^{18}$, $R^{15}$ and $R^{17}$, $R^{16}$ and R[18], R[15] and R[18] or R[16] and R[17], may each bond (with each other) and form a monocyclic or polycyclic group, and the monocyclic or polycyclic group formed in this manner may have double bonds. Specific examples of the monocyclic or polycyclic group formed herein are given below.

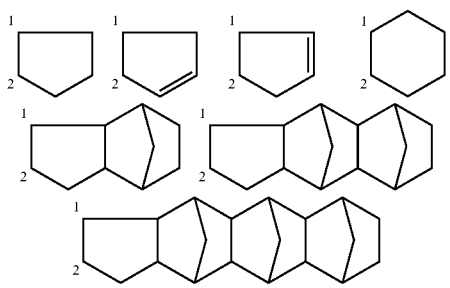

It is to be noted that in the above example, the carbon atoms that have been numbered 1 or 2 represent carbon atoms that bond with R[15] (R[16]) or R[17] (R[18]) respectively in the general formula (I).

Also an alkyldene group may also be formed with R's and R[16] or R[17] and R[18]. This type of alkylidene group normally has 2-20 carbon atoms and specific examples of this type of alkylidene group include an ethylidene group, a propylidene group and an isopropylidene group.

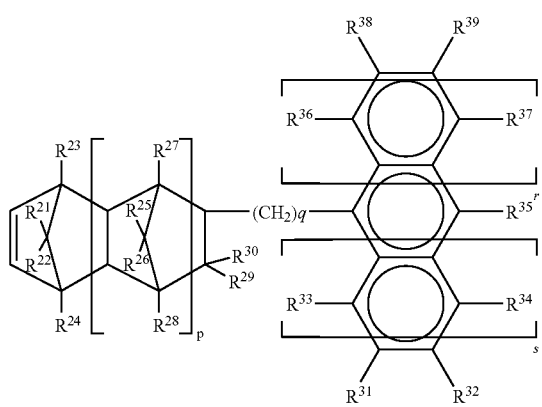

(II)

In the formula, p and q independently represent 0 or a positive integer and r and s independently represent 0, 1 or 2. R[21] to R[39] independently represent a hydrogen atom, a halogen atom, a hydrocarbon group or an alkoxy group.

The halogen atom herein is the same as the halogen atom in general formula (I). Examples of the hydrocarbon normally include an alkyl group having 1 to 20 carbon atoms, a cycloalkyl group or an aromatic hydrocarbon having 3-15 carbon atoms. More specifically, examples of the alkyl group include a methyl group, an ethyl group, a propyl group, an isopropyl group, an amyl group, a hexyl group, an octyl group, a decyl group, a dodecyl group and an octadecyl group. These alkyl groups may be substituted by a halogen atom.

An example of the cycloalkyl group is a cyclohexyl group and examples of the aromatic hydrocarbon include an aryl group and an aralkyl group, and more specifically, a phenyl group, a tolyl group, a naphtyl group, a benzyl group, a phenylethyl group and the like.

Examples of the alkoxy group include a methoxy group, an ethoxy group, a propoxy group, and the like. The carbon atoms which bonds with R[29] and R[30], the carbon atom which bonds with R[33] and the carbon atom which bonds with R[31] may bond together directly or via a alkylene group having 1-3 carbon atoms. That is to say, in the case where the two carbon atoms are bonded together via an alkylene group, R[29] and R[33] or R[30] and R[31] together with each other form one of alkylene groups which are the methylene group (—CH$_2$—), ethylene group (—CH$_2$CH$_2$—) or propylene group (—CH$_2$CH$_2$CH$_2$—).

In addition, when r=s=0, R[35] and R[32] or R[35] and R[39] may bond to each other to form a monocyclic or polycyclic aromatic ring. More specifically, when r=s=0, examples of the aromatic ring which is formed from R[35] and R[32] include the following.

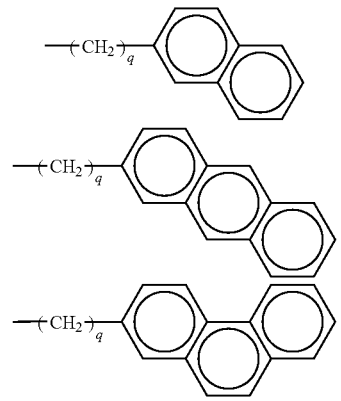

q herein is the same as in the general formula (II). Specific examples of the cyclic olefins shown in the general formula (I) and the general formula (II) above include bicyclo-2-heptene derivatives (bicyclohept-2-ene derivatives), tricyclo-3-decene derivatives, tricyclo-3-undecene derivatives, tetracyclo-3-dodecene derivatives, pentacyclo-4-pentadecene derivatives, pentacyclopentadecadiene derivatives, pentacyclo-3-pentadecene derivatives, pentacyclo-3-hexadecene derivatives, pentacyclo-4-hexadecene derivatives, hexacyclo-4-heptadecene derivatives, heptacyclo-5-eicocene derivatives, heptacyclo-4-eicocene derivatives, heptacyclo-5-heneicocene derivatives, octacyclo-5-docecene, nonacyclo-5-pentacocene, nonacyclo-6-hexacocene derivatives, cyclopentadiene-acenapthtylene addition compounds, 1,4 methano-1,4,4a,9a-tetrahydrofluorene derivatives, 1,4 methano-1,4,4a,5,10,10a-hexahydroantracene derivatives and the like.

More specific examples of the cyclic olefins represented by the general formula (I) and general formula (II) above are shown below.

 bicyclo [2.2.1]hept-2-ene,

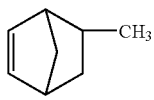 5-methyl bicyclo [2.2.1] hept-2-ene,

-continued

| | | |
|---|---|---|
| 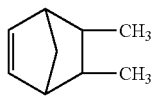 | 5,6-dimethyl bicyclo [2.2.1] hept-2-ene, | |
| 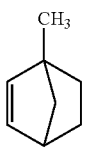 | 1-methyl bicyclo [2.2.1] hept-2-ene, | |
| 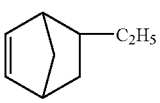 | 5-ethyl bicyclo [2.2.1] hept-2-ene, | |
| 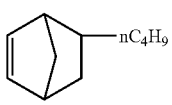 | 5-n-butyl bicyclo [2.2.1] hept-2-ene, | |
| 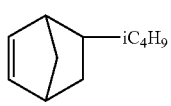 | 5-isobutyl bicyclo [2.2.1] hept-2-ene, | |
| 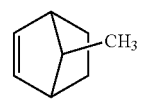 | 7-methyl bicyclo [2.2.1] hept-2-ene. | |

Tetracyclo [4.4.0.1$^{2.5}$.1$^{7.10}$]-3-dodecene derivatives such as:

| | | |
|---|---|---|
|  | tetracyclo [4.4.0.1$^{2.5}$1$^{7.10}$]-3-dodecene, | |
| 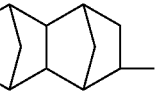 | 8-methyltetracyclo [4.4.0.1$^{2.5}$.1$^{7.10}$]-3-dodecene, | |
| 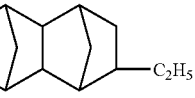 | 8-ethyl tetracyclo [4.4.0.1$^{2.5}$.1$^{7.10}$]-3-dodecene, | |
| 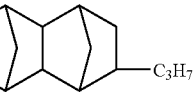 | 8-propyl tetracyclo [4.4.0.1$^{2.5}$.1$^{7.10}$]-3-dodecene, | |
| 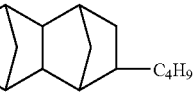 | 8-butyl tetracyclo [4.4.0.1$^{2.5}$.1$^{7.10}$]-3-dodecene, | |
| 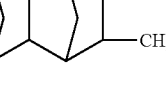 | 8-isobutyl tetracyclo [4.4.0.1$^{2.5}$1$^{7.10}$]-3-dodecene, | |

-continued

| | | |
|---|---|---|
| 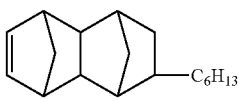 | 8-hexyl tetracyclo [4.4.0.1$^{2.5}$.1$^{7.10}$]-3-dodecene, | |
| 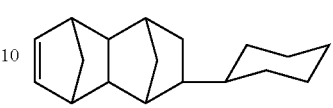 | 8-cyclohexyl tetracyclo [4.4.0.1$^{2.5}$.1$^{7.10}$]-3-dodecene, | |
|  | 8-stearyl tetracyclo [4.4.0.1$^{2.5}$.1$^{7.10}$]-3-dodecene, | |
| 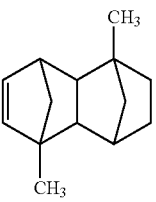 | 5,10-dimethyl tetracyclo [4.4.0.1$^{2.5}$.1$^{7.10}$]-3-dodecene, | |
| 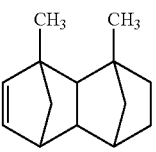 | 2,10-dimethyl tetracyclo [4.4.0.1$^{2.5}$.1$^{7.10}$]-3-dodecene, | |
| 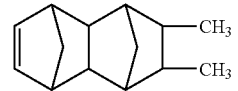 | 8,9-dimethyl tetracyclo [4.4.0.1$^{2.5}$.1$^{7.10}$]-3-dodecene | |
| 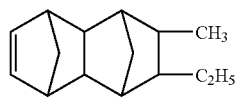 | 8-ethyl-9-methyl tetracyclo [4.4.0.1$^{2.5}$.1$^{7.10}$]-3-dodecene, | |
| 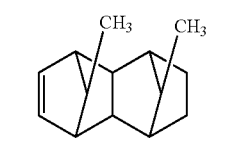 | 11,12-dimethyl tetracyclo [4.4.0.1$^{2.5}$.1$^{7.10}$]-3-dodecene, | |
| 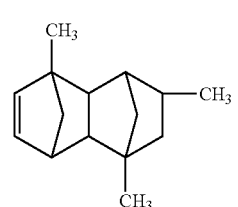 | 2,7,9-trimethyl tetracyclo [4.4.0.1$^{2.5}$.1$^{7.10}$]-3-dodecene, | |
| 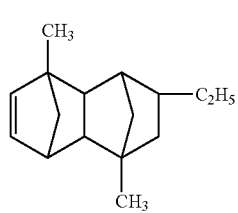 | 9-ethyl-2,7-dimethyl tetracyclo [4.4.0.1$^{2.5}$.1$^{7.10}$]-3-dodecene, | |

-continued
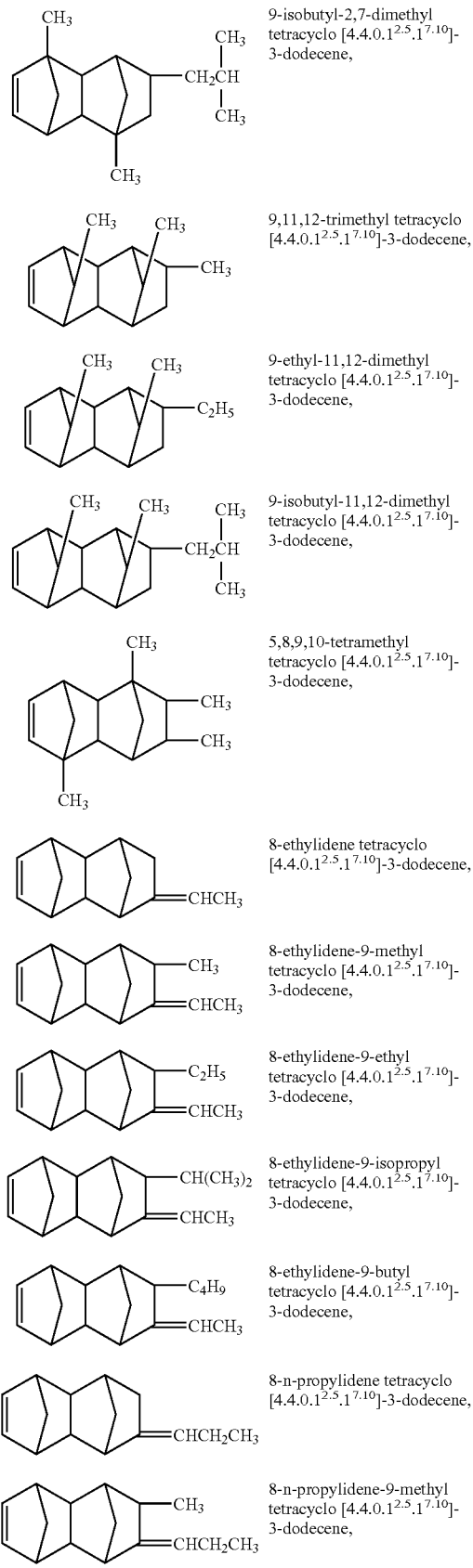
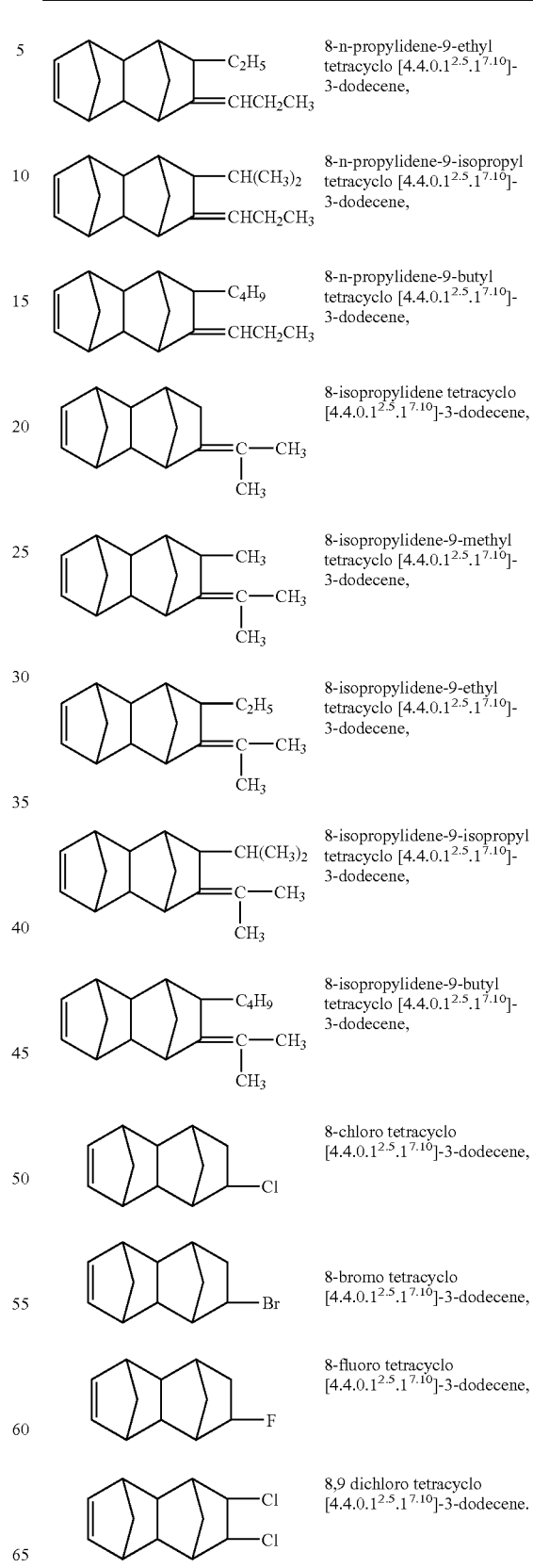

Hexacyclo [6.6.1.1$^{3,6}$.1$^{10,13}$.0$^{2,7}$.0$^{9,14}$]-4-heptadecen derivatives such as:

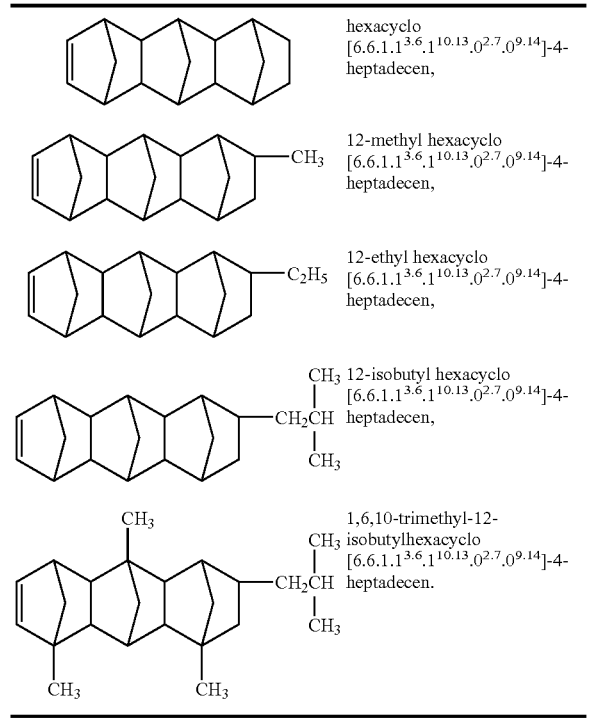

hexacyclo [6.6.1.1$^{3,6}$.1$^{10,13}$.0$^{2,7}$.0$^{9,14}$]-4-heptadecen, 12-methyl hexacyclo [6.6.1.1$^{3,6}$.1$^{10,13}$.0$^{2,7}$.0$^{9,14}$]-4-heptadecen, 12-ethyl hexacyclo [6.6.1.1$^{3,6}$.1$^{10,13}$.0$^{2,7}$.0$^{9,14}$]-4-heptadecen, 12-isobutyl hexacyclo [6.6.1.1$^{3,6}$.1$^{10,13}$.0$^{2,7}$.0$^{9,14}$]-4-heptadecen, 1,6,10-trimethyl-12-isobutylhexacyclo [6.6.1.1$^{3,6}$.1$^{10,13}$.0$^{2,7}$.0$^{9,14}$]-4-heptadecen.

Octacyclo [8.8.0.1$^{2,9}$.1$^{4,7}$.1$^{11,18}$.1$^{13,16}$.0$^{3,8}$.0$^{12,17}$]-5-docosene derivatives such as:

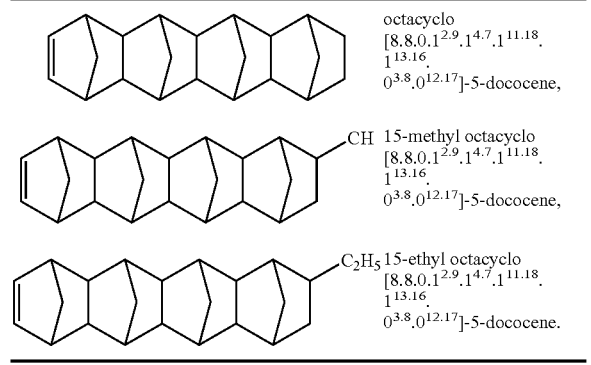

octacyclo [8.8.0.1$^{2,9}$.1$^{4,7}$.1$^{11,18}$.1$^{13,16}$.0$^{3,8}$.0$^{12,17}$]-5-docosene, 15-methyl octacyclo [8.8.0.1$^{2,9}$.1$^{4,7}$.1$^{11,18}$.1$^{13,16}$.0$^{3,8}$.0$^{12,17}$]-5-docosene, 15-ethyl octacyclo [8.8.0.1$^{2,9}$.1$^{4,7}$.1$^{11,18}$.1$^{13,16}$.0$^{3,8}$.0$^{12,17}$]-5-docosene.

Pentacyclo [6.6.1.1$^{3,6}$.0$^{2,7}$.0$^{9,14}$]-4-hexadecene derivatives such as:

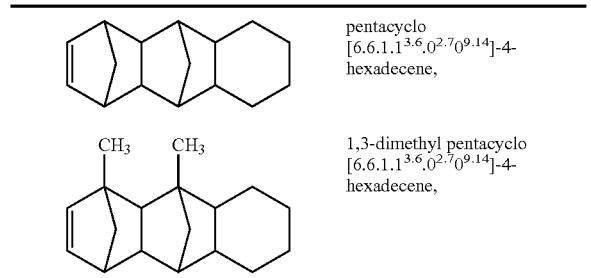

pentacyclo [6.6.1.1$^{3,6}$.0$^{2,7}$.0$^{9,14}$]-4-hexadecene, 1,3-dimethyl pentacyclo [6.6.1.1$^{3,6}$.0$^{2,7}$.0$^{9,14}$]-4-hexadecene,

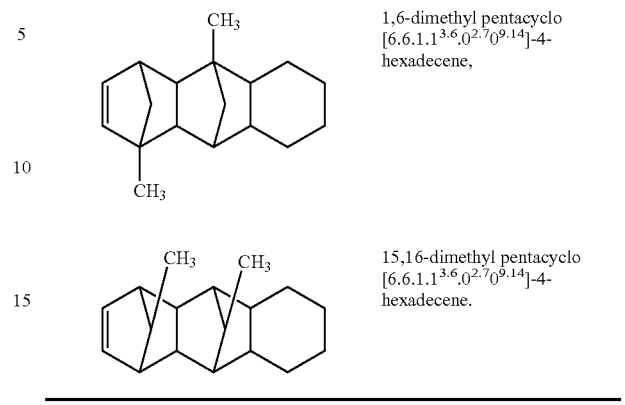

1,6-dimethyl pentacyclo [6.6.1.1$^{3,6}$.0$^{2,7}$.0$^{9,14}$]-4-hexadecene, 15,16-dimethyl pentacyclo [6.6.1.1$^{3,6}$.0$^{2,7}$.0$^{9,14}$]-4-hexadecene.

Heptacyclo-5-eicocene derivatives or heptacyclo-5-heneicocene derivatives such as:

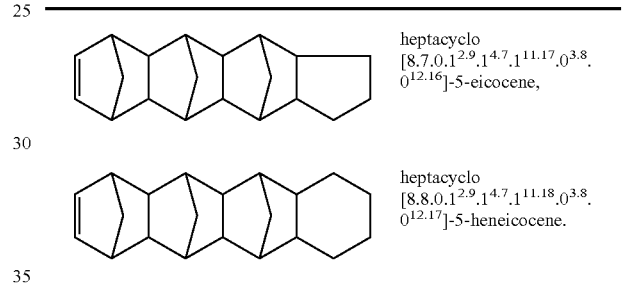

heptacyclo [8.7.0.1$^{2,9}$.1$^{4,7}$.1$^{11,17}$.0$^{3,8}$.0$^{12,16}$]-5-eicocene, heptacyclo [8.8.0.1$^{2,9}$.1$^{4,7}$.1$^{11,18}$.0$^{3,8}$.0$^{12,17}$]-5-heneicocene.

Tricyclo [4.3.0.1$^{2,5}$]-3-decene derivatives such as:

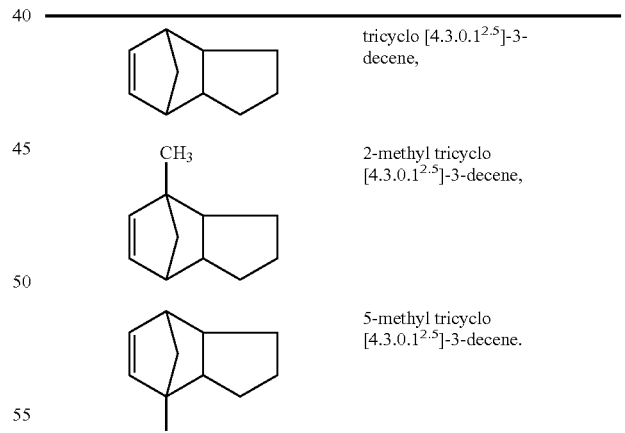

tricyclo [4.3.0.1$^{2,5}$]-3-decene, 2-methyl tricyclo [4.3.0.1$^{2,5}$]-3-decene, 5-methyl tricyclo [4.3.0.1$^{2,5}$]-3-decene.

Tricyclo [4.4.0.1$^{2,5}$]-3-undecene derivatives such as:

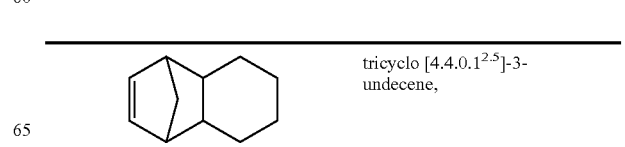

tricyclo [4.4.0.1$^{2,5}$]-3-undecene,

-continued

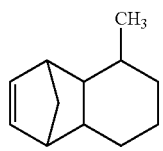
10-methyl tricyclo [4.4.0.1$^{2.5}$]-3-undecene.

Pentacyclo [6.5.1.1$^{3.6}$.0$^{2.7}$.0$^{9.13}$]-4-pentadecene derivatives such as:

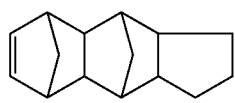
pentacyclo [6.5.1.1$^{3.6}$.0$^{2.7}$.0$^{9.13}$]-4-pentadecene,

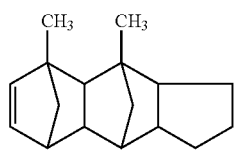
1,3 dimethyl pentacyclo [6.5.1.1$^{3.6}$.0$^{2.7}$.0$^{9.13}$]-4-pentadecene,

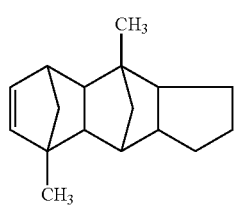
1,6 dimethyl pentacyclo [6.5.1.1$^{3.6}$.0$^{2.7}$.0$^{9.13}$]-4-pentadecene,

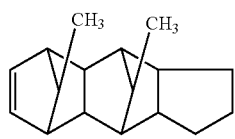
14,15 dimethyl pentacyclo [6.5.1.1$^{3.6}$.0$^{2.7}$.0$^{9.13}$]-4-pentadecene.

Diene compounds such as:

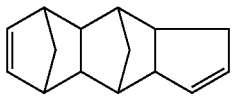
pentacyclo [6.5.1.1$^{3.6}$.0$^{2.7}$.0$^{9.13}$]-4,10-pentadecadiene.

Pentacyclo [7.4.0.1$^{2.5}$.1$^{9.12}$.0$^{8.13}$]-3-pentadecene derivatives such as:

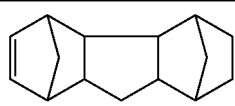
pentacyclo [7.4.0.1$^{2.5}$.1$^{9.12}$.0$^{8.13}$]-3-pentadecene,

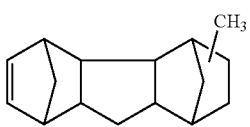
methyl substituted pentacyclo [7.4.0.1$^{2.5}$.1$^{9.12}$.0$^{8.13}$]-3-pentadecene Heptacyclo [8.7.0.1$^{3.6}$.1$^{10.17}$.1$^{12.15}$.0$^{2.7}$.0$^{11.16}$]-4-eicocene derivatives such as:

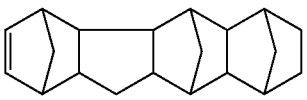
heptacyclo [8.7.0.1$^{3.6}$.1$^{10.17}$.1$^{12.15}$.0$^{2.7}$.0$^{11.16}$]-4-eicocene,

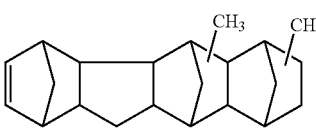
dimethyl substituted heptacyclo [8.7.0.1$^{3.6}$.1$^{10.17}$.1$^{12.15}$.0$^{2.7}$.0$^{11.16}$]-4-eicocene.

Nonacyclo [10.9.1.1$^{4.7}$.1$^{13.20}$.1$^{15.18}$.0$^{3.8}$.0$^{2.10}$.0$^{12.21}$.0$^{14.19}$]-5-pentacocene derivatives such as:

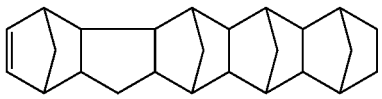
nonacyclo [10.9.1.1$^{4.7}$.1$^{13.20}$.1$^{15.18}$.0$^{3.8}$.0$^{2.10}$.0$^{12.21}$.0$^{14.19}$]-5-pentacocene,

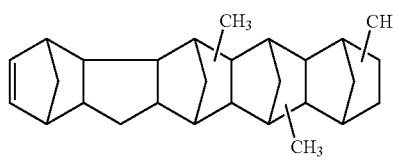
trimethyl substituted nonacyclo [10.9.1.1$^{4.7}$.1$^{13.20}$.1$^{15.18}$.0$^{3.8}$.0$^{2.10}$.0$^{12.21}$.0$^{14.19}$]-5-pentacocene.

Pentacyclo [8.4.0.1$^{2.5}$.1$^{9.12}$.0$^{8.13}$]-3-hexadecene derivatives such as:

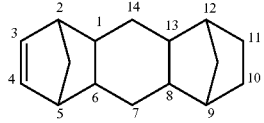
pentacyclo [8.4.0.1$^{2.5}$.1$^{9.12}$.0$^{8.13}$]-3-hexadecene,

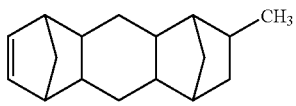
11-methyl-pentacyclo [8.4.0.1$^{2.5}$.1$^{9.12}$.0$^{8.13}$]-3-hexadecene,

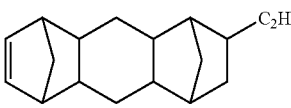
11-ethyl-pentacyclo [8.4.0.1$^{2.5}$.1$^{9.12}$.0$^{8.13}$]-3-hexadecene,

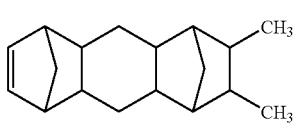
10,11-dimethyl-pentacyclo [8.4.0.1$^{2.5}$.1$^{9.12}$.0$^{8.13}$]-3-hexadecene.

Heptacyclo [8.8.0.1$^{4.7}$.1$^{11.18}$.1$^{13.16}$.0$^{3.8}$.0$^{12.17}$]-5-heneicocene derivatives such as:

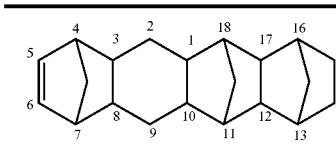
heptacyclo [8.8.0.1$^{4.7}$.1$^{11.18}$.1$^{13.16}$.0$^{3.8}$.0$^{12.17}$]-5-heneicocene, -continued

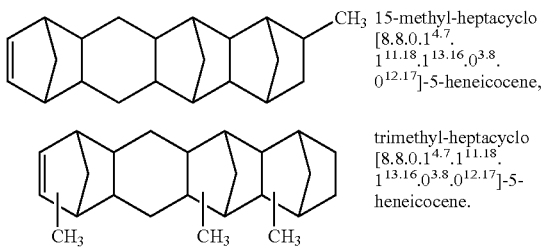

15-methyl-heptacyclo [8.8.0.1$^{4.7}$.1$^{11.18}$.1$^{13.16}$.0$^{3.8}$.0$^{12.17}$]-5-heneicocene, trimethyl-heptacyclo [8.8.0.1$^{4.7}$.1$^{11.18}$.1$^{13.16}$.0$^{3.8}$.0$^{12.17}$]-5-heneicocene.

Nonacyclo [10.10.1.1$^{5.8}$.1$^{14.21}$.1$^{16.19}$.0$^{2.11}$.0$^{4.9}$.0$^{13.22}$.0$^{15.20}$]-5-hexacocene derivatives such as:

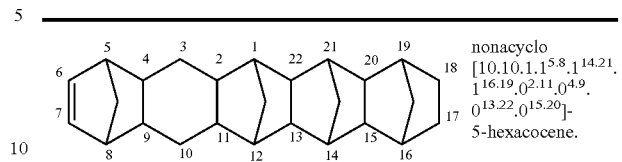

nonacyclo [10.10.1.1$^{5.8}$.1$^{14.21}$.1$^{16.19}$.0$^{2.11}$.0$^{4.9}$.0$^{13.22}$.0$^{15.20}$]-5-hexacocene.

Other examples include:

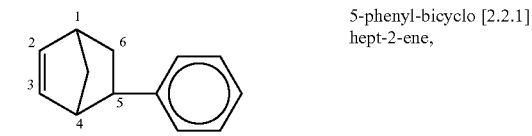

5-phenyl-bicyclo [2.2.1] hept-2-ene,

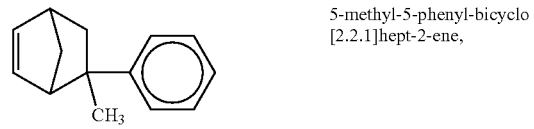

5-methyl-5-phenyl-bicyclo [2.2.1]hept-2-ene,

5-benzyl-bicyclo [2.2.1] hept-2-ene,

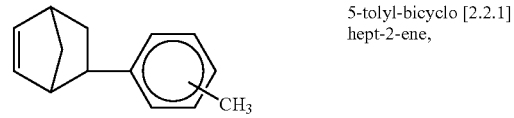

5-tolyl-bicyclo [2.2.1] hept-2-ene,

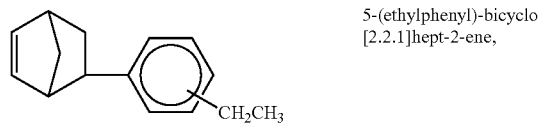

5-(ethylphenyl)-bicyclo [2.2.1]hept-2-ene,

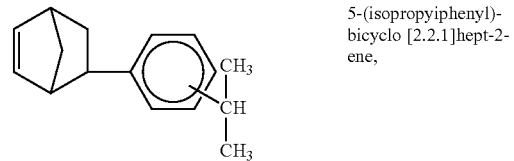

5-(isopropylphenyl)-bicyclo [2.2.1]hept-2-ene,

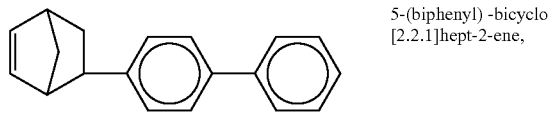

5-(biphenyl)-bicyclo [2.2.1]hept-2-ene,

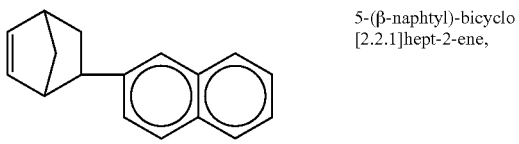

5-(β-naphtyl)-bicyclo [2.2.1]hept-2-ene,

-continued

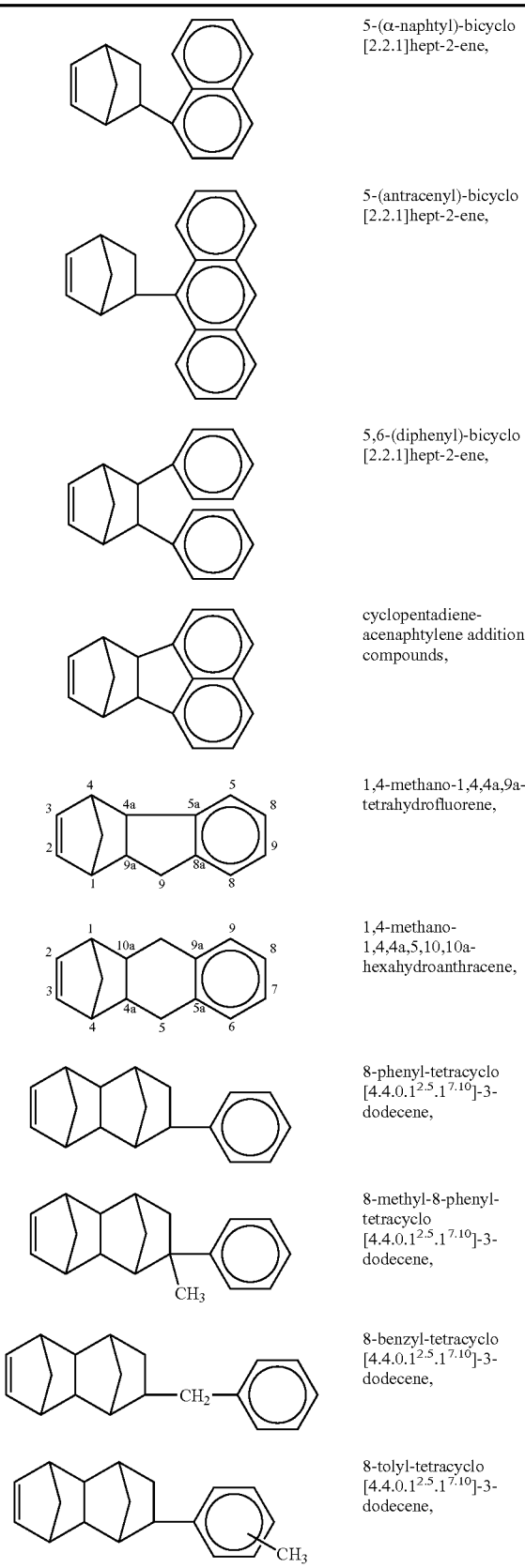

5-(α-naphtyl)-bicyclo [2.2.1]hept-2-ene, 5-(antracenyl)-bicyclo [2.2.1]hept-2-ene, 5,6-(diphenyl)-bicyclo [2.2.1]hept-2-ene, cyclopentadiene-acenaphtylene addition compounds, 1,4-methano-1,4,4a,9a-tetrahydrofluorene, 1,4-methano-1,4,4a,5,10,10a-hexahydroanthracene, 8-phenyl-tetracyclo [4.4.0.1$^{2.5}$.1$^{7.10}$]-3-dodecene, 8-methyl-8-phenyl-tetracyclo [4.4.0.1$^{2.5}$.1$^{7.10}$]-3-dodecene, 8-benzyl-tetracyclo [4.4.0.1$^{2.5}$.1$^{7.10}$]-3-dodecene, 8-tolyl-tetracyclo [4.4.0.1$^{2.5}$.1$^{7.10}$]-3-dodecene, -continued

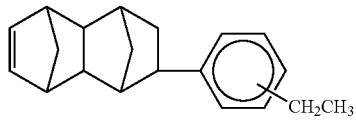
8-(ethylpheny)-tetracyclo [4.4.0.1$^{2.5}$.1$^{7.10}$]-3-dodecene,

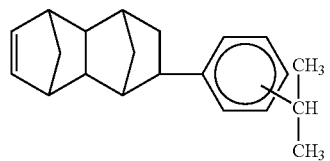
8-(isopropylphenyl)-tetracyclo [4.4.0.1$^{2.5}$.1$^{7.10}$]-3-dodecene,

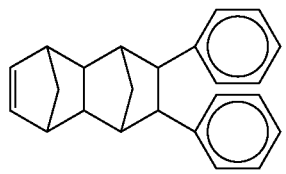
8,9-diphenyl-tetracyclo [4.4.0.1$^{2.5}$.1$^{7.10}$]-3-dodecene,

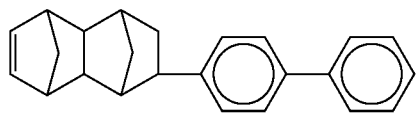
8-(biphenyl)-tetracyclo [4.4.0.0$^{2.5}$.1$^{7.10}$]-3-dodecene,

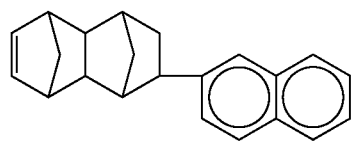
8-(β-naphtyl)-tetracyclo [4.4.0.0$^{2.5}$.1$^{7.10}$]-3-dodecene,

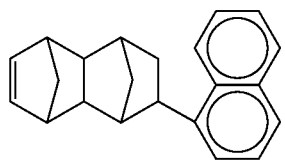
8-(α-naphtyl)-tetracyclo [4.4.0.0$^{2.5}$.1$^{7.10}$]-3-dodecene,

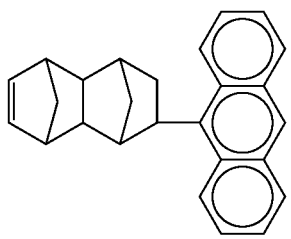
8-(antracenyl)-tetracyclo [4.4.0.$^{2.5}$.1$^{7.10}$]-3-dodecene,

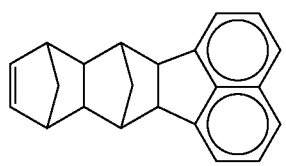
addition compounds in which cyclopentadiene is further added to (cyclopentadiene-acenaphtylene addition compounds),

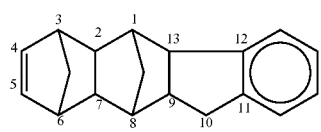
11,12-benzo-pentacyclo [6.5.1.3$^{3.6}$.0$^{2.7}$.0$^{9.13}$]-4-pentadecene, -continued

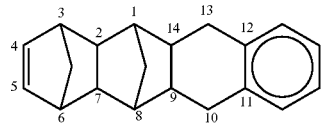
11,12-benzo-pentacyclo [6.5.1.1$^{3.6}$.0$^{2.7}$.0$^{9.14}$]-4-hexadecene,

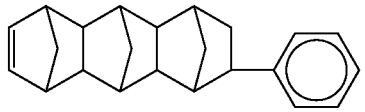
11-phenyl-hexacyclo [6.6.1.1$^{3.6}$.1$^{10.13}$.0$^{2.7}$. 0$^{9.14}$]-4-pentadecene,

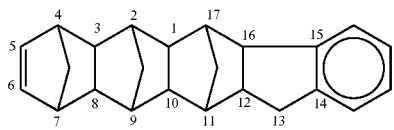
14,15-benzo-heptacyclo [8.7.0.1$^{2.9}$.1$^{4.7}$.1$^{11.17}$. 0$^{3.8}$.0$^{12.16}$]-5-eicocene.

In addition, examples of the α-olefin that forms the copolymer include straight chain α-olefins such as ethylene, propylene, 1-butene, 1-pentene, 1-hexene, 1-octene, 1-decene, 1-dodecene, 1-tetradecene, 1-hexadecene, 1-octadecene and 1 eiciocene; branched chain α-olefins such as 4-methyl-1-pentene, 3-methyl-1-pentene, 3-methyl-1-butene. α-olefins having 2-20 carbon atoms are preferable. The straight chain and branched chain olefins may be substituted with a substitution group, and may be used singly or in combinations of two or more.

The various substitution groups are not particularly limited and typical examples include alkyl, aryl, anilino, acylamino, sulfonamide, alkylthio, arylthio, alkenyl, cycloalkyl, cycloalkenyl, alkinyl, heterocycle, alkoxy, aryloxy, heterocyclic oxy, siloxy, amino, alkylamino, imido, ureido, sulfamoylamino, alkoxycarbonylamino aryloxycarbonylamino, alkoxycarbonyl, aryloxy carbonyl, heterocyclic thio, thioureido, hydroxyl and mercapto groups, as well as spiro compound residues, bridged hydrocarbon compound residues, sulfonyl, sulfinyl, sulfonyl oxy, sulfamoyl, phosphoryl, carbamoyl, acyl, acyloxy, oxycarbonyl, carboxyl, cyano, nitro, halogen substituted alkoxy, halogen substituted aryloxy, pyrrolyl, tetrazolyl groups and halogen atoms and the like.

The alkyl group preferably has 1-32 carbon atoms, and may be straight chain or branched. The aryl group is preferably a phenyl group.

Examples of the acylamino group include an alkylcarbonylamino group and an arylcarbonylamino group. Examples of the sulfonamide group include an alkylsulfonylamino group, an arylsulfonylamino group. Examples of the alkyl component and aryl component in the alkylthio group and the arylthio group include the alkyl groups and aryl groups above.

The alkenyl group preferably has 2-23 carbon atoms, and the cycloalkyl group preferably has 3-12 carbon atoms and a group with 5-7 carbon atoms is particularly preferable and the alkenyl group may be a straight chain or branched chain. The cycloalkenyl group preferably has 3-12 carbon atoms and a group with 5-7 carbon atoms is particularly preferable.

Examples of the ureido group include an alkyl ureido group, an aryl ureido group. Examples of the sulfamoyl amino group include an alkyl sulfamoyl amino group and an aryl sulfamoyl amino group. The heterocyclic group preferably has 5-7 members and specific examples include 2-furyl, 2-thienyl, 2-pyrimidinyl, 2-benzothiazolyl and the like. The saturated heterocyclic ring preferably has 5-7 members, and specific examples include tetrahydropyranyl, tetrahydrothi-opyranyl and the like. The heterocyclic oxy group preferably has a heterocyclic ring having 5-7 members and specific examples include 3,4,5,6-tetrahydropyranyl-2-oxy, 1-phenyl tetrazole-5-oxy and the like. The heterocyclic thio group preferably has 5-7 members and examples include 2-pyridyl thio, 2-benzothiazorylthio and 2,4-diphenoxy-1,3,5-triazole-6-thio. Examples of the siloxy group include trimethylsiloxy, triethylsiloxy and dimethylbutylsiloxy. Examples of the imide group include imide succinate, 3-heptadecyl imide succinate, phtalimide, glutarimide and the like. Examples of the spiro compound residue include spiro [3.3] heptane-1-yl and the like. Examples of the bridged hydrocarbon compound residue include bicyclo [2.2.1] heptan-1-yl, tricyclo [3.3.1.13.7] decan-1-yl, and 7,7-dimethyl-bicyclo [2.2.1] heptan-1-yl and the like.

Examples of the sulfonyl group include an alkylsulfonyl group, an arylsufonyl group, a halogen substituted alkyl sulfonyl group, a halogen substituted aryl sulfonyl group and the like. Examples of the sulfinyl group include an alkyl sulfinyl group, an aryl sulfinyl group and the like. Examples of the sulfonyloxy group include an alkyl sulfonyl oxy group, an aryl sulfonyl oxy group and the like. Examples of the sulfamoyl group include an N,N-dialkyl sulfamoyl group, an N,N-diaryl sulfamoyl group, an N-alkyl-N-aryl sulfamoyl group and the like. Examples of the phosphoryl group include an alkoxy phosphoryl group, an aryloxy phosphoryl group, an alkyl phosphoryl group, an aryl phosphoryl group and the like. Examples of the carbamoyl group include an N,N-dialkyl carbamoyl group, N,N-diaryl carbamoyl group, an N-alkyl-N-aryl carbamoyl group and the like. Examples of the acyl group include an alkyl carbonyl group, an aryl carbonyl group and the like. Examples of the acyloxy group include an alkylcarbonyloxy group and the like. Examples of the oxycarbonyl group include an alkoxy carbonyl group, an aryloxy carbonyl group and the like. Examples of the halogen substituted alkoxy group include an α-halogen substituted alkoxy group. Examples of the halogen substituted aryloxy group include a tetrafluoroaryloxy group, a pentafluoraryloxy group and the like. Examples of the pyrrolyl group include 1-pyrrolyl and the like. Examples of the tetrazolyl group include 1-tetrazolyl and the like.

Aside from the above substitution groups, groups such as trifluoromethyl, heptafluoro-i-propyl, nonylfluoro-t-butyl, and a tetrafluoroaryl group, a pentafluoroaryl group and the like may be preferably used. In addition, the substitution groups may be substituted by other substitution groups.

In view of formability, the amount of non-cyclic monomer in the copolymer according to the present invention is preferable 20 weight % or more, and is more preferably between 25% and 90% and still more preferably between 30% and 85%.

The glass transition temperature (Tg) of the polymer or copolymer in this invention is preferably in the range of 80-250° C., and more preferably 90-220° C., and most preferably 100-200° C. The number average molecular weight (Mn) preferably in the range of 10,000,000, more preferably 20,000 and most preferably 50,000 with a polystyrene conversion value measured by gel permeation chromatography (GPC). When the molecular weight distribution is shown by the ratio (Mw/Mn) of Mn and the weight average molecular weight with the polystyrene conversion value measured in the same manner by GPC, it is preferably 2.0 or less.

When Mw/Mn is too large, the mechanical strength and the thermal stability of the body formed are reduced. In order to increase mechanical strength in particular, and thermal stability and formation processing properties, Mw/Mn is preferably 1.8 or less and 1.6 or less is particularly preferable.

The temperature at the time of polymerization is preferably selected from the range 0 to 200° C. and more preferably 50 to 150° C., and the pressure is selected from the range of atmospheric pressure to 100 atmospheres. The molecular weight of the polymer formed can be easily adjusted by including hydrogen in the polymer band.

The olefin resin in this invention may be a polymer synthesized from a single component cyclic monomer, but is preferably a cyclic monomer having 2 components or more, or a copolymer synthesized from a cyclic monomer and a non-cyclic monomer. The copolymer may be formed using monomers having 100 components or more, but it is preferable that the monomer mixture has 10 components or less in view of production efficiency and polymer stability. 5 components or less is even more preferable.

The copolymer obtained may be a crystalline polymer or a non-crystalline polymer, but a non-crystalline polymer is preferable.

Known methods may be used for the method of hydrogen addition of the carbon-unsaturated carbon bond (including an aromatic ring) of the polymer and copolymer in this invention, but of these, it is preferable to perform the hydrogen addition reaction using a catalyst including at least one metal selected from nickel, cobalt, iron, titanium, rhodium, palladium, platinum, ruthenium, and rhenium in an organic solvent in order to improve the hydrogen addition ratio and to reduce the polymer chain breaking reaction that occurs simultaneously with the hydrogen addition reaction. A heterogeneous catalyst or a homogenous catalyst may be used as the hydrogenation catalyst. The homogenous catalysts may simply be a metal or metal compound or may be carried by a carrier. Examples of the carrier include active carbon, silica, alumina, calcium carbide, titania, magnesia, zirconia, diatomaceous earth, silicon carbide and the like, and the amount of the catalyst carrier which is the amount of metal to the total weight amount of catalyst is normally in the range of 0.01-80 weight % and more preferably 0.05-60 weight %. The homogenous catalyst may be a catalyst in which nickel, cobalt, titanium or an iron compound is combined with an organic metal compound (such as an organic aluminum compound and an organic lithium compound), or an organic metal complex catalyst such as rhodium, palladium, platinum, ruthenium, and rhenium. These hydrogenation catalysts may be used singly or in combinations of two or more, and the amount used is usually 0.01-100 parts by weight and more preferably 0.05-50 parts by weight, and still more preferably 0.1-30 parts by weight for 100 parts by weight of the copolymer.

The temperature of the hydrogen addition reaction is usually 0 to 300° C., and preferably room temperature to 250° C., and 50 to 200° C. is particularly preferable.

The hydrogen pressure is usually 0.1 MPa to 30 MPa, and preferably 1 MPa to 20 MPa, and still more preferably 2 MPa to 15 MPa. The hydrogen addition ratio of the obtained hydrogen additive is usually 90% or more, more preferably 95% or more, and still more preferably 97% or more when measured by 1H-NMR, in view of thermal stability and weather stability. If the hydrogen addition ratio is low, the optical properties such as transparency, low birefringence and heat stability of the obtained polymer will be reduced.

The catalyst used in the hydrogen addition reaction of the polymer and copolymer according to the present invention can be any type provided that it dissolves the polymer and copolymer according to the present invention and the solvent itself is not subjected to hydrogen addition, and examples include ethers such as tetrahydrofluoran, diethyl ether, dibutyl ether, dimethoxy ethane; aromatic hydrocarbons such as benzene, toluene, xylene, ethyl benzene and the like; aliphatic hydrocarbons such as pentane, hexane, heptane and the like, aliphatic cyclic hydrocarbons such as cyclopentane, cyclohexane, methyl cyclohexane, dimethyl cyclohexane, decalin and the like; halogenated hydrocarbons such as methylene dichloride, dichloroethane, dichloroethylene, tetrachloroethane, chlorobenzene, trichlorobenzene and the like, and these may be used in combinations of two or more.

The production of the polymer and copolymer according to the present invention may be done by separating the hydrogen additive of the polymer or copolymer from the polymer solution and then re-dissolving in a solvent, but the method may also be used in which the hydrogen addition reaction is performed by adding a hydrogen addition catalyst formed from the organic metal complex and organic aluminum compounds without performing separation. After the hydrogen addition reaction is complete, the hydrogen addition catalyst remaining in the polymer may be removed by a known method. Examples include an absorption method using an absorption agent; an extraction method in which an organic acid such as lactic acid and the like and a poor solvent and water are added to a solution of a good solvent and the system is subjected to extraction and removal at room temperature or at increased temperature; and a washing method in which washing is done after a solution of a good solvent or a polymer slurry is subjected to contact treatment with a basic compound such as trimethylene diamine, aniline, pyridine, or ethane diamide in the environment of a gas such as nitrogen or hydrogen, or contact treatment is done with an acidic compound such as acetic acid, citric acid, benzoic acid, hydrochloric acid, and the like after contact treatment or at the same time as contact treatment.

The method for collecting the polymer hydride from the hydrogen addition solution of the polymer or the copolymer is not particularly limited, and any known method may be used. Examples include collection methods such as a filtration method in which the reaction solution is extracted from the poor solvent while stirring and the polymer hydride coagulates; a centrifuge separation method; and a decantation method, as well a steam stripping method in which the reaction solution is blown into steam and the polymer hydride is concentrated, and a direct removal method in which the solvent is directly removed from the reaction solution by heating and the like.

When the hydrogen addition reaction according to the present invention is used, a hydrogen addition rate of 90% or more is easily achieved, and a rate of 95% or more and 99% or more in particular is possible, and the obtained polymer or copolymer hydride is not easily oxidized and thus an excellent polymer or copolymer hydride is formed.

<Method of Preparing Resin Composition>

The method of preparing the resin composition according to the present invention will be described in the following.

The resin composition according to the present invention is preferably subjected to specific treatment prior to the molding step (molding process), and at the treatment stage, plasticizers, antioxidants and other additives which are normally added to resins, may be added.

A preferable method of preparing the resin composition according to the present invention is a kneading process or a solvent removal method in which the mixture is dissolved in a solvent and the composition is obtained by drying, but the kneading process is more preferable. The kneading process may be those processes used in blending normal resins. Rolls, banbury mixers, biaxial kneaders, and kneader ruder may be used but the banbury mixer, biaxial mixers, and kneader ruder are preferable. In order to prevent oxidation of the resin, a device in which kneading is possible in a sealed system is used and more preferably, the kneading process is performed in an inactive gas such as nitrogen or argon.

When preparing the resin composition according to the present invention, or during the molding process for the resin composition, various additives (called blending agents) may be added according to need. The additives used are not particularly limited, and examples include stabilizers such as antioxidants, thermal stabilizers, light stabilizers, weather stabilizers, ultraviolet light absorbers, and near infrared light absorbers; resin improving agents such as lubricants and plasticizers; colorants such as dyes and pigments; antistatic agents, flame retardants and fillers. These blending agents may be used singly or in combinations of two or more, and may be suitably selected within a range where the effects of the invention are not compromised.

<Antioxidant>

The antioxidant used for the present invention will be described in the following.

As the antioxidant, a phenol antioxidant, a phosphorus antioxidant and a sulfur antioxidant are usable and the phenol antioxidant, particularly an alkyl-substituted phenol antioxidant, is preferable. By the addition of such the antioxidants, coloring and strength lowering of the lens caused oxidation on the occasion of the lens formation can be prevented without lowering in the transparency and the resistivity against heat. These antioxidants may be employed singly or in combination of two or more of them. Though the adding amount of the antioxidant may be optionally decided within the range in which the effects of the present invention are not disturbed, the amount is preferably 0.001 to 5, and more preferably from 0.01 to 1, parts by weight to 100 parts by weight of the polymer relating to the present invention.

Known phenol antioxidants can be employed. Examples of the phenol antioxidant include acrylate compounds described in Nos. 63-179953 and 1-168643 such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; alkyl-substituted phenol compounds such as octadecyl-3-(3,5-di-t-butyl-4-hydroxyphenyl propionate, 2,2'-methylene-bis(4-methyl-6-t-butylphenyl), 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl propionate)methane, pentaerythrimethyl-tetrakis(3-(3,5-di-t-butyl-4-hydroxyphenyl propionate)) and triethylene glycol-bis(3-(3-t-butyl-4-hydroxy-5-methylphenyl)propionate; and triazine group-containing phenol compounds such as 6-(4-hydroxy-3,5-di-t-butylanilino)-2,4-bisoctylthio-1,3,5-triazine, 4-bisoctylthio-1,3,5-triazine and 2-octylthio-4,6-bis(3,5-di-t-butyl-4-oxyanilino)-1,3,5-triazine.

The phosphorus antioxidants usually employed in the resin industry are usable without any limitation. Examples of the phosphorus antioxidant include monophosphites such as triphenyl phosphite, diphenyl isodecyl phosphite, phenyl diisodecyl phosphite, tris(nonylphenyl) phosphite, tris(dinonylphenyl) phosphite, tris(2,4-di-t-butylphenyl) phosphite and 10-(3,5-di-t-butyl-4-hydroxybenzyl)-9,10-dihydro-9-oxa-10-phosphaphenathlene-10-oxide; and diphosphites such as 4,4'-butylidene-bis(3-methyl-6-t-butylphenyl-ditridecyl phosphite) and 4,4'-isopropylidene-bis(phenyl-dialkyl (C12 to C15) phosphite. Among them the monophosphites particularly tris(nonylphenyl) phosphite, tris(dinonylphenyl)phosphite and tris(2,4-di-t-butylphenyl) phosphite, are preferable.

Examples of the sulfur antioxidant include dilauryl 3,3-thiodipropionate, dimiristyl 3,3'-thiodipropionate, distearyl 3,3-thiodipropionate, lauryl stearyl 3,3-thiodipropionate, penterythritol-tetrakis(β-lauryl-thio-propionate) and 3,9-bis(2-dodecylthioethyl)-2,4,8,10-tetraoxaspiro[5,5]undecane.

<Light Stabilizer>

The light stabilizer used in the present invention will be described in the following.

As a light stabilizer, a benzophenone light stabilizer, a benzotriazole light stabilizer and a hindered amine light stabilizer are cited. In the present invention, the hindered amine light stabilizers are preferably employed from the viewpoint of the transparency and the anti-coloring ability of the lens. Among the hindered amine light stabilizer, hereinafter referred to as HALS, ones having a Mn measured by GOC using tetrahydrofuran (THF) and converted into polystyrene of from 1,000 to 10,000, particularly from 2,000 to 5,000, and especially from 2,800 to 3,800, are preferable. When the Mn is too small, the designated amount of the HALS is difficultly added by the reason of evaporation thereof on the occasion of the addition of the HALS into the block-copolymer by heating, meting and kneading, or the processing suitability of the composite material is lowered so that a bubble and a silver streak are formed on the occasion of the forming by heating and melting. Furthermore, the volatile ingredient is formed in a gas state when the lens is used for long time while the light source lamp lights. When the Mn is too large, the dispersibility of the HALS in the block copolymer is lowered so that the transparency of the lens is decreased and the improving effect on the light stabilization is lowered. In the present invention, therefore, the lens superior in the processing stability, low gas formation and transparency can be obtained by making the Mn of the HALS into the above range.

Concrete examples of the HALS include a high molecular weight HALS composed by combining plural piperidine rings through triazine skeletons such as N,N',N'',N'''-tetrakis-[4,6-bis-{butyl-(N-methyl-2,2,6,6-tetramethylpiperidine-4-yl)amino}-triazine-2-yl]-4,7-diazadecane-1,10-diamine, a polycondensation product of dibutylamine, 1,3,5-triazine and N,N'-bis(2,2,6,6-tetramethyl-4-piperidyl)butylamine, poly[{(1,1,3,3-tetramethylbutyl)amino-1,3,5-triazine-2,4-di-yl}{(2,2,6,6-tetramethyl-4-piperidyl)imino}hexamethylene{(2,2,6,6-tetramethyl-4-piperidyl)imino}], a polycondensation product of 1,6-hexanediamine-N,N'-bis(2,2,6,6- tetramethyl-4-piperidyl) and morpholine-2,4,6-trichloro-1,3,5-triazine, and poly[(6-morpholino-s-triazine-2,4-di-yl)(2,2,6,6-tetramethyl-4-piperidyl)imino]-hexamethylene-(2,2,6,6-tetramethyl-4-piperidyl)imino]; and a high molecular weight composed by combining piperidine rings through ester bonds such as a polymer of dimethyl succinate and 4-hydroxy(2,2,6,6-tetramethyl-1-piperidineethanol, a mixed ester of 1,2,3,4-butenetetracarboxylic acid, 1,2,2,6,6-pentamethyl-4-piperidinol and 3,9-bis(2-hydroxy-1,1-dimethylethyl)-2,4,8,10-tetraoxaspiro[5,5]undecane.

Among them, ones having a Mn of from 2,000 to 5,000 such as the polycondensation product of dibutylamine, 1,3,5-triazine and N,N'-bis(2,2,6,6-tetramethyl-4-piperidyl)butylamine, poly[(6-morpholino-s-triazine-2,4-di-yl)(2,2,6,6-tetramethyl-4-piperidyl)imino]-hexamethylene-(2,2,6,6-tetramethyl-4-piperidyl)imino] and the polymer of dimethyl succinate and 4-hydroxy(2,2,6,6-tetramethyl-1-piperidineethanol are preferable.

The adding amount of the above-compounds to the composite material of the present invention is preferably from 0.01 to 20, more preferably from 0.02 to 15, and particularly preferably from 0.05 to 10, by weight to 100 parts by weight of the polymer. When the adding amount is too small, the satisfactory improving effect in the light resistivity can not be obtained so that the coloring of the lens is caused during use for log period at out of door. When the adding amount of the HALS is excessively large, a part of it causes gas and the dispersing ability in the resin is lowered so that the transparency of the lens is decreased.

Occurrence of white turbid of the lens during for long period under high temperature and high humid condition can be prevented without degradation in the transparency, heat resistivity and mechanical strength by the addition of a compound having the lowest glass transition point of not more than 30° C. to the composite material of the present invention.

Therefore, the present invention provides a resin composition according to the present invention and a resin composition containing at least one additive selected from the group consisting of (1) a soft polymer, and (2) an alcoholic compound. By adding such the additives, occurrence of white turbid caused by standing for a long period under a high temperature and high humidity condition can be prevented without degradation in properties such as the transparency, low moisture absorption and mechanical strength.

Among the above-mentioned, (1) the soft polymer and (2) the alcoholic compound are excellent in the white turbid preventing effect and the transparency of the resin composition.

(1) Soft Polymer

The soft polymer to be employed in the invention is usually a polymer having a Tg of not more than 30° C. When the polymer shows plural Tgs, it is allowed that the lowest Tg is not more than 30° C.

The concrete examples of the soft polymer include an olefin type copolymer such as liquid polyethylene, polypropylene, poly-1-butene, ethylene•α-olefin copolymer, propylene•α-olefin copolymer, ethylene•propylene•diene copolymer (EPDM) and ethylene•propylene•styrene copolymer; an isobutylene type soft polymer such as polyisobutylene, isobutylene•isoprene rubber and isobutylene•styrene copolymer; a diene type soft polymer such as polybutadiene, polyisoprene, butadiene•styrene random copolymer, isoprene•styrene random copolymer, acrylonitrile•butadiene copolymer, acrylonitrile•butadiene•styrene copolymer, butadiene•styrene block copolymer, isoprene•styrene block copolymer, styrene•butadiene•styrene block copolymer, isoprene•styrene block copolymer and styrene•isoprene•styrene block copolymer; a silicon-containing soft polymer such as dimethylpolysiloxane, diphenylpolysiloxane and dihydroxypolysiloxane; a soft polymer composed of a α,β-unsaturated acid such as poly(butyl acrylate), poly(butyl methacrylate), poly(hydroxyethyl methacrylate), polyacrylamide, polyacrylonitrile and butyl acrylate•styrene copolymer; a soft polymer composed of a unsaturated alcohol and amine, an acyl derivative thereof or acetal such as poly(vinyl alcohol), poly(vinyl acetate), poly(vinyl stearate) and cetate•styrene copolymer; an epoxy type soft polymer such as poly(ethylene oxide), poly(propylene oxide) and epichlorohydrine rubber; a fluorine-containing soft polymer such as vinylidene fluoride type rubber and ethylene tetrafluoride•propylene rubber; and another soft polymer such as natural rubber, polypeptide, protein, a polyester type thermoplastic estramer, a vinyl chloride type thermoplastic estramer and a polyamide type thermoplastic estramer. The soft polymers may be one having a crosslinking structure and one introduced with a functional group by a modification reaction.

In the above soft polymers, the diene type soft polymer is preferable, particularly a hydride compound in which carbon-carbon unsaturated bond is hydride, is superior in the rubber elasticity, mechanical strength, softness and dispersing ability.

(2) Alcoholic Compound

The alcoholic compound is a compound having at least one non-phenolic hydroxyl group, and preferably at least one hydroxyl group and at least one ether bond or ester bond. Concrete examples of such the compound include an alcoholic ether and ester compounds such as a poly-valent alcohol for example di or more-valent alcohol, preferably tri or more-valent alcohol, and more preferably poly-valent alcohol having 3 to 8 hydroxyl groups, in which one of the hydroxyl group is etherized or esterized.

As the di- or more-valent alcohol, for example, poly(ethylene glycol), glycerol, trimethylolpropane, pentaerythrytol, diglycerol, triglycerol, dipentaerythrytol, 1,6,7-trihydroxy-2,2-di(hydroxymethyl)-4-oxo-heptane, sorbitol, 2-methyl-1,6,7-trihydroxy-2-hydroxymethyl-4-oxo-heptane, 1,5,6-trihydroxy-3-oxo-hexanepentaerythrytol and tris(2-hydroxyethyl)isocyanurate are cited, and the tri- or more-valent alcohol, particularly having 3 to 8 hydroxyl groups, are preferable. To obtain the alcoholic ester compound, glycerol, diglycerol and triglycerol are preferable, by which alcoholic ester compound containing α,β-diol can be synthesized.

Examples of such the alcoholic compound include a poly-valent alcoholic esterized compound such as glycerol monostearate, glycerol monolaurate, glycerol monobehenate, diglycerol monostearate, glycerol distearate, glycerol dilaurate, pentaerythrytol monostearate, pentaerythrytol monolaurate, pentaerythrytol monobehenate, pentaerythrytol distearate, pentaerythrytol dilaurate, pentaerythrytol tristearate and dipentaerythrytol distearate; 3-(octyloxy)-1,2-propanediol, 3-(decyloxy)-1,2-propanediol, 3-(lauryloxy)-1,2-propanediol, 3-(4-nonylphenyloxy)-1,2-propanediol, 1,6-dihydroxy-2,2-di(hydroxymethyl)-7-(4-nonylphenyloxy)-4-oxo-eptane, an alcoholic ether compound obtained by reaction of a condensate of p-nonylphenyl ether with formaldehyde and glycidol, an alcoholic ether compound obtained by reaction of a condensate of p-octylphenyl ether with formaldehyde and crycidol, and an alcoholic ether compound obtained by reaction of a condensate of p-octylphenyl ether with dicyclopentadiene and crycidol are employable. These poly-valent alcoholic compounds are employed singly or in combination of two or more kinds thereof. The molecular weight of these poly-valent alcoholic compounds is usually from 500 to 2,000, preferably from 800 to 1,500 even though the molecular weight is not specifically limited.

(3) Organic or Inorganic Filler

As the organic filler, a usual organic polymer particle or a crosslinked organic polymer particle can be employed. For example, a particle or a crosslinked particle of a polyolefin such as polyethylene and polypropylene; a halogen-containing vinyl polymer such as poly(vinyl chloride) and poly(vinylidene chloride); a polymer derived from a α,β-unsaturated acid such as polyallylate and polymethacrylate; a polymer derived from a unsaturated alcohol such as poly(vinyl alcohol) and poly(vinyl acetate); a polymer derived from poly (ethylene oxide) or bisglycidol ether; an aromatic condensate polymer such as poly(phenylene oxide), polycarbonate and polysulfone; polyurethane; polyamide; polyester; aldehyde; aldehyde•phenol type resin; and natural polymer compound are employable.

As the inorganic filler, for example, a powder of a compound of an element of Group 1 of periodic table such as lithium fluoride and borax (sodium borate hydrate); a compound of an element of Group 2 such as magnesium carbonate, magnesium phosphate, calcium carbonate, strontium titanate and barium carbonate; a compound of an element of Group 4 such as titanium dioxide (titania) and titanium monoxide; a compound of an element Group 6 such as molybdenum dioxide and molybdenum trioxide; a compound of an element of Group 7 such as manganese chloride and manganese acetate; a compound of an element of Groups 8 to 10 such as cobalt chloride and cobalt acetate; a compound of an element of Group 11 such as cuprous iodide; a compound of an element of Group 12 such as zinc oxide and zinc acetate; a compound of an element of Group 13 such as aluminum oxide (alumina), aluminum fluoride and aluminosilicate (alumina silicate, kaolin and kaolinite): a compound of an element of Group 14 such as silicon oxide (silica and silicagel); and a natural mineral such as graphite, carbon and glass; carnallite, kainite, mica (mica and golden mica) and pyrolusite are employable.

Though the adding amount of the compounds of (1) to (3) is decided by the combination of the polymer having the alicyclic structure and the compound to be added, the glass transition point and the transparency of the composition is largely lowered when the adding amount is too large in general. When the adding amount is too small, white turbid tends to occur under the high temperature and high humid condition so that the composition becomes unsuitable to use for the optical material. The adding amount is usually from 0.01 to 10, preferably from 0.02 to 5, particularly preferably from 0.05 to 2, parts by weight to 100 parts by weight of the polymer having the alicyclic structure. When the adding amount is too small, the effect for preventing occurrence of the white turbid under the high temperature and high humidity condition cannot be obtained, and when the adding amount is too large, the heat resistivity and the transparency of the molded product are lowered.

<Another Additive>

Another additive such as a UV absorbent, a light stabilizer, a near infrared absorbent, a colorant such as a dye and a pigment, a slipping agent, a plasticizer, an antistatic agent and a fluorescent whitening agent may be added to the resin composition of the invention according to necessity. These additives may be employed singly or in a combination of two or more kinds thereof, and the adding amount is optionally decided within the range in which the object of the invention is not vitiated.

At least one optical surface described above of the substrate 30 and both optical surfaces in this embodiment have an antireflection film 31 as shown in FIG. 2.

The antireflection film 31 is formed by alternately laminating higher refractive index layers and lower refractive index layers, and preferably has a total of 7 to 9 layers.

In this embodiment, the antireflection film 31 is formed by vacuum vapor deposition, but the method of film formation is not limited to this and can be made using any general method. For example, aside from vacuum vapor deposition, spattering, spin coating, dip coating, the CVD method and the atmospheric pressure plasma method may also be used.

The higher refractive index layer has a refractive index equal to or larger than 1.8 and equal to or smaller than 2.2 for light flux with a wavelength of 450 nm. It is to be noted that examples of the material for forming the higher refractive index layer include hafnium oxide, zirconium oxide, titanium oxide, magnesium oxide, lanthanum oxide, zirconium titanate, tantalum oxide, silicon oxide, thorium oxide, yttrium oxide, praseodymium oxide, and scandium oxide, and these may be used singly or mixed and zirconium oxide is preferably used.

The lower refractive index layers have a refractive index equal to or larger than 1.4 and equal to or less than 1.6 for light flux with a wavelength of 450 nm. Between the multiple lower refractive index layers, at least two lower refractive index layers, preferably a couple of lower refractive index layers arranged at either side of one of the higher refractive index layer have the same main component each other and have a side component with a different content ratio independently. In this embodiment, the content ratio of the side component of the multiple lower refractive index layers is indicated by two values which are large and small, and the layer for which the value of the ratio is large (called first lower refractive index layer hereinafter) and the layer with the small value (called second lower refractive index layer hereinafter) are place alternately to form a laminate with the higher refractive index layers laminated between the lower refractive index layers. It is to be noted that silicon dioxide can be used as the main component for the lower refractive index layer, and aluminum oxide for the side component.

Here, the layer arranged at the closest position to the substrate 30 is the first layer, the layer arranged at the second closest position to the substrate 30 is the second layer and the layer arranged at the nth (where n is an integer) closest position to the substrate 30 is the nth layer and given that the odd number layers are the first lower refractive index layers or the second lower refractive index layers while the even number layers are the higher refractive index layers, in one example of the antireflection 31 such as that described above, the thickness of the first layer is 100 to 130 nm; the thickness of the second layer is 10 to 14 nm; the thickness of the third layer is 28 to 36 nm; the thickness of the fourth layer is 46 to 60 nm; the film thickness of the fifth layer is 13 to 17 nm; the thickness of the sixth layer is 44 to 55 nm; the thickness of the seventh layer is 75 to 95 nm.

In this case, in another example of the antireflection film 31, the thickness of the first layer is 85 to 105 nm; the thickness of the second layer is 11 to 15 nm; the thickness of the third layer is 30 to 38 nm; the thickness of the fourth layer is 54 to 68 nm; the thickness of the fifth layer is 20 to 25 nm; the thickness of the sixth layer is 34 to 43 nm; the thickness of the seventh layer is 85 to 108 nm.

In this case, in another example of the antireflection film 31, the thickness of the first layer is 100 to 130 nm; the film thickness of the second layer is 13 to 17 nm; the thickness of the third layer is 42 to 52 nm; the thickness of the fourth layer is 50 to 63 nm; the thickness of the fifth layer is 13 to 17 nm; the thickness of the sixth layer is 52 to 65 nm; the thickness of the seventh layer is 85 to 108 nm.

In this case, in another example of the antireflection film 31, the thickness of the first layer is 80 to 100 nm; the thickness of the second layer is 10 to 14 nm; the thickness of the third layer is 46 to 58 nm; the thickness of the fourth layer is 10 to 14 nm; the thickness of the fifth layer is 14 to 18 nm; the thickness of the sixth layer is 33 to 42 nm; the thickness of the seventh layer is 27 to 35 nm; the thickness of the eighth layer is 35 to 45 nm; the thickness of the ninth layer is 94 to 117 nm.

Figure 8:
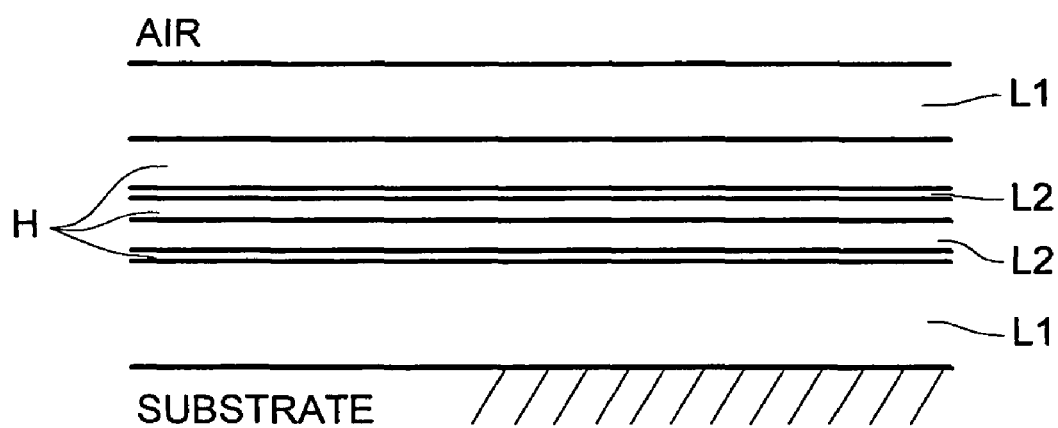
FIG. 8 is a cross-sectional view of an example of the antireflection film formed of 7 layers.
Figure 9:
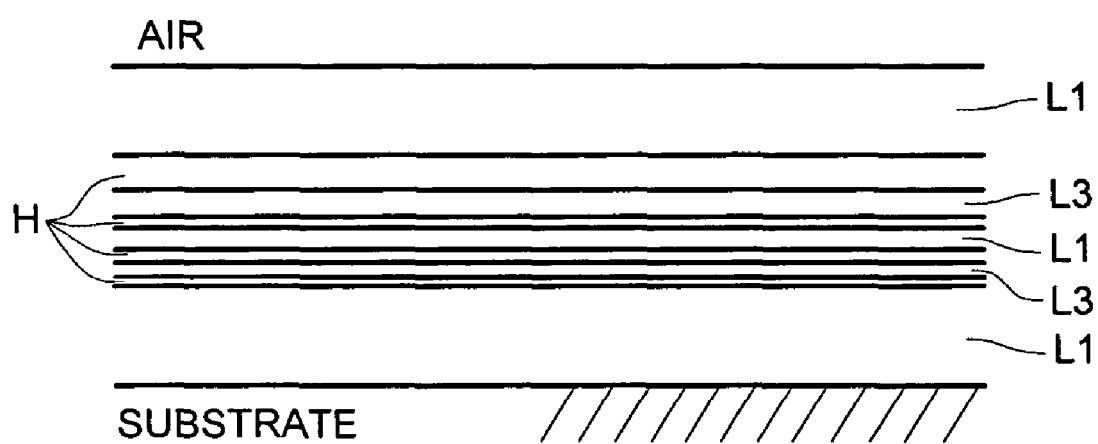
FIG. 9 is a cross-sectional view of an example of the antireflection film formed of 9 layers.

FIGS. 8 and 9 show a cross-section of an example of the antireflection layer formed of 7 layers and a cross-section of an example of the antireflection layer formed of 9 layers. In the drawing, H is the higher refractive index layer, and L1-L3 show lower refractive index layers which have the same amounts of the main components and different amounts of the side components.

Figure 10:
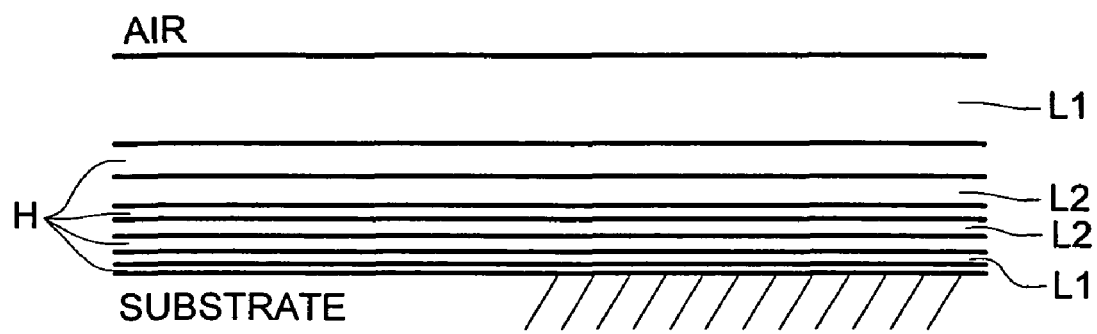
FIG. 10 is a cross-sectional view of an example of the antireflection film formed of 8 layers.

In this embodiment, antireflection layers 31 having 7 layers and 9 layers are described, but the antireflection layer 31 may also have 8 layers. A cross-section of an example of the antireflection layer comprising 7 layers is shown in FIG. 10.

In this case, the first layer which is positioned closest to the substrate 30 side is a higher refractive index layer and the eighth layer is the a lower refractive index layer, and the odd-numbered layers between these are higher refractive index layers while the even-numbered layers are lower refractive index layers and as a result, an antireflection film having the same effects as the 7 layers and 9 layers above can be obtained.

In the abovementioned objective lens 3, when there are changes in the environmental conditions, even if film stress is generated in the layers, in at least two of the lower refractive index layers, the content ratio of the side component is different and thus the size and direction of the film stress is different for the two lower refractive index layers. Thus, the gravitational effect of the film stress generated in the lower refractive index layers can be reduced and cracking and peeling of the prior art can be prevented when compared to the prior art, or in other words environmental resistance is improved.

In addition, in the optical lens 3, a favorable transmittance is obtained for light in the wavelength region from 350 to 450 nm, and the optical pickup apparatus, objective lens which converges at least a light flux with single wavelength in the range of 350 to 450 nm can be used.

It is to be noted that in this embodiment, the objective lens 3 is described as the optical element, but the collimator lens 22 or a beam expander or the like may be used.

Also, in this description, the objective lens 3 has only one substrate, but it may have two or more.

Furthermore, the objective lens 3 has a substrate 30 and an antireflection film 31, but a backing layer may be placed between the substrate 30 and the antireflection film 31 in order to improve adhesion of the antireflection layer 31. The surface of the antireflection layer 31 may have a soil-proofing layer for preventing soiling and the like, a water repelling layer for repelling water, and an antistatic layer for preventing attachment of dust due to electrostatic electricity. The "backing layer" herein may be formed of a silane coupling treatment layer. In addition, the "soil-proofing layer" and the "water proofing layer" may be formed of a fluorine based organic compound or a silicon based organic compound, and the film thickness is usually 7 nm or less. In the case where the "soil-proofing layer" and the "water proofing layer" is formed of a fluorine based organic compound, it is a thin layer of perfluoroalkyl silane whose vapor deposition material is WR1 (Trade name of Merck Ltd.) and is formed by coating with a fluorine based coating solution L-182560 (Trade name of Sumitomo 3M Ltd.) On the other hand, in the case where the "soil-proofing layer" and the "water proofing layer" are formed of silicon based organic compounds, a thin film of dimethyldiethoxysilane (DMDES) is formed using the atmospheric pressure plasma method (see Japanese Patent Application Laid-Open No. 2003-161817 publication). The "antistatic layer" may be formed for a transparent and conductive thin layer and the thickness of the layer should be 10 nm or less. More specifically, the "antistatic layer" is formed form one of, or a mixture of a combination of two or more of tin oxide, indium oxide, and zinc oxide using vacuum deposition of spattering.

Example 1

This invention is described in more detail using the examples and comparative examples.

<Composition of the Objective Lens>

Examples (1)-(5) and comparative examples (1) to (3) of objective lens in this embodiment are formed by providing antireflection films of the layer compositions shown in Table 1 on the optical surface of the substrate 30.

TABLE 1

| Data | Structure of Objective Lens | Structure of Lower Refractive Index Layer | Light stability | Environmental Stability | Overall Evaluation |
|---|---|---|---|---|---|
| Comparative Example (1) | Table 7 | Only $L_1$ | B | C | C |
| Comparative Example (2) | Table 8 | Only $L_3$ | C | D | D |
| Comparative Example (3) | Table 9 | Only $L_2$ | B | C | C |
| Example (1) | Table 2 | $L_1$ and $L_3$ | B | A | B |
| Example (2) | Table 3 | $L_2$ and $L_3$ | B | B | B |
| Example (3) | Table 4 | $L_1$ and $L_2$ | B | B | B |
| Example (4) | Table 5 | $L_1$ and $L_3$ | B | B | B |
| Example (5) | Table 6 | $L_1$ and $L_3$ | B | B | B |

More specifically, the objective lens of examples (1) to (5) use the antireflection film having the layer structure shown in Table 2 to Table 6 below. In the antireflection film, the "first" layer, the "third" layer, the "fifth" layer, and the "seventh" layer are the lower refractive index layers according to the present invention and the "second" layer, the "fourth" layer, and the "sixth" layer are the higher refractive index layers according to the present invention.

The objective lens of comparative examples (1) to (3) use the antireflection film having the layer structure shown in Table 7 to Table 9 below.

TABLE 2

| Layer | Material | Refractive Index | Thickness |
|---|---|---|---|
| Medium | Air | 1 | |
| 1 | $L_1$ | 1.49 | 85 |
| 2 | $ZrO_2$ | 1.98 | 50 |
| 3 | $L_3$ | 1.52 | 15 |
| 4 | $ZrO_2$ | 1.98 | 55 |

TABLE 2-continued

| Layer | Material | Refractive Index | Thickness |
|---|---|---|---|
| 5 | $L_3$ | 1.52 | 32 |
| 6 | $ZrO_2$ | 1.98 | 12 |
| 7 | $L_1$ | 1.49 | 113 |
| Substrate | APEL | | |

TABLE 3

| Layer | Material | Refractive Index | Thickness |
|---|---|---|---|
| Medium | Air | 1 | |
| 1 | $L_2$ | 1.5 | 85 |
| 2 | $ZrO_2$ | 1.98 | 50 |
| 3 | $L_3$ | 1.52 | 15 |
| 4 | $ZrO_2$ | 1.98 | 55 |
| 5 | $L_3$ | 1.52 | 32 |
| 6 | $ZrO_2$ | 1.98 | 12 |
| 7 | $L_2$ | 1.5 | 113 |
| Substrate | APEL | | |

TABLE 4

| Layer | Material | Refractive Index | Thickness |
|---|---|---|---|
| Medium | Air | 1 | |
| 1 | $L_1$ | 1.49 | 85 |
| 2 | $ZrO_2$ | 1.98 | 50 |
| 3 | $L_2$ | 1.5 | 15 |
| 4 | $ZrO_2$ | 1.98 | 55 |
| 5 | $L_2$ | 1.5 | 32 |
| 6 | $ZrO_2$ | 1.98 | 12 |
| 7 | $L_1$ | 1.49 | 113 |
| Substrate | APEL | | |

TABLE 5

| Layer | Material | Refractive Index | Thickness |
|---|---|---|---|
| Medium | Air | 1 | |
| 1 | $L_3$ | 1.52 | 97 |
| 2 | $ZrO_2$ | 1.98 | 38 |
| 3 | $L_1$ | 1.49 | 22 |
| 4 | $ZrO_2$ | 1.98 | 61 |
| 5 | $L_3$ | 1.52 | 34 |
| 6 | $ZrO_2$ | 1.98 | 12 |
| 7 | $L_1$ | 1.49 | 95 |
| Substrate | APEL | | |

TABLE 6

| Layer | Material | Refractive Index | Thickness |
|---|---|---|---|
| Medium | Air | 1 | |
| 1 | $L_3$ | 1.52 | 97 |
| 2 | $ZrO_2$ | 1.98 | 59 |
| 3 | $L_1$ | 1.49 | 15 |
| 4 | $ZrO_2$ | 1.98 | 57 |
| 5 | $L_3$ | 1.52 | 47 |
| 6 | $ZrO_2$ | 1.98 | 15 |
| 7 | $L_1$ | 1.49 | 112 |
| Substrate | APEL | | |

TABLE 7

| Layer | Material | Refractive Index | Thickness |
|---|---|---|---|
| Medium | Air | 1 | |
| 1 | $L_1$ | 1.49 | 85 |
| 2 | $ZrO_2$ | 1.98 | 50 |
| 3 | $L_1$ | 1.49 | 15 |
| 4 | $ZrO_2$ | 1.98 | 55 |
| 5 | $L_1$ | 1.49 | 32 |
| 6 | $ZrO_2$ | 1.98 | 12 |
| 7 | $L_1$ | 1.49 | 113 |
| Substrate | APEL | | |

TABLE 8

| Layer | Material | Refractive Index | Thickness |
|---|---|---|---|
| Medium | Air | 1 | |
| 1 | $L_3$ | 1.52 | 85 |
| 2 | $ZrO_2$ | 1.98 | 50 |
| 3 | $L_3$ | 1.52 | 15 |
| 4 | $ZrO_2$ | 1.98 | 55 |
| 5 | $L_3$ | 1.52 | 32 |
| 6 | $ZrO_2$ | 1.98 | 12 |
| 7 | $L_3$ | 1.52 | 113 |
| Substrate | APEL | | |

TABLE 9

| Layer | Material | Refractive Index | Thickness |
|---|---|---|---|
| Medium | Air | 1 | |
| 1 | $L_2$ | 1.5 | 85 |
| 2 | $ZrO_2$ | 1.98 | 50 |
| 3 | $L_2$ | 1.5 | 15 |
| 4 | $ZrO_2$ | 1.98 | 55 |
| 5 | $L_2$ | 1.5 | 32 |
| 6 | $ZrO_2$ | 1.98 | 12 |
| 7 | $L_2$ | 1.5 | 113 |
| Substrate | APEL | | |

It is to be noted that in Tables 2 to 9, the refractive index refers to the refractive index for a light flux of wavelength of 450 nm.

In addition, "$L_1$", "$L_2$" and "$L_3$" are formed of a material with silicon dioxide as its main component, and include 0% or more aluminum oxide as the side component. More specifically, as shown in Table 10 below, "$L_1$" is material for which the content ratio of the side component included is equal to or more than 0% and less than 1%. "$L_2$" is material for which the content ratio of the side component included is equal to or more than 1% and less than 4%. "$L_3$" is material for which the content ratio of the side component included is equal to or more than 4% and less than 6%.

The refraction indices of "$L_1$", "$L_2$" and "$L_3$" can be controlled with the range of 1.4-1.6 by changing rate of film formation for the lower refractive index layer or the vacuum level at the time of film formation, but in the case where the films are formed under the same conditions, the size is such that "$L_1$"<"$L_2$"<"$L_3$". In this example, the rate of formation of the lower refractive index layer is approximately 6 Å/s, the vacuum level for film formation is $1\times10^{-3}$ Pa or less, and the substrate temperature at the time of film formation is approximately 90° C., and the refractive index for light flux of wavelength 450 nm is 1.49 for "$L_1$", 1.50 for "$L_2$" and 1.52 for "$L_3$".

TABLE 10

| Material | Ratio of Side Component (X) | Refractive index ($\lambda_0 = 450$) |
| --- | --- | --- |
| $L_1$ | 0% ≦ X < 1% | 1.49 |
| $L_2$ | 1% ≦ X < 4% | 1.50 |
| $L_3$ | 4% ≦ X < 6% | 1.52 |

In this example, the higher refractive index layer is formed from zirconium oxide, but it may also be formed from hafnium oxide, zirconium oxide, titanium oxide, magnesium oxide, lanthanum oxide, zirconium titanate, tantalum oxide, silicon oxide, thorium oxide, yttrium oxide, praseodymium oxide, and scandium oxide, and these may be used singly or as mixtures. Generally, the refractive index of the light flux having a wavelength of 450 nm shows values of 2.05 for hafnium oxide, 1.98 for zirconium oxide, 2.2 for titanium oxide, 1.8 for magnesium oxide, 1.88 for lanthanum oxide, 2.1 for zirconium titanate, 2.1 for tantalum oxide, 2.1 for thorium oxide, 1.96 for yttrium oxide, and 2.0 for praseodymium oxide. That is to say, the higher refractive index layer is formed of materials having a refractive index for light flux having a wavelength of 450 nm being equal to or more than 1.8 and equal to or more than 2.2.

It is to be noted that the substrate 30 is formed of APL5014DP (manufactured by Mitsui Chemicals, Inc. and also called APEL in this specification), and is a resin formed from a copolymer of the cyclic olefin shown in general formula (III) below.

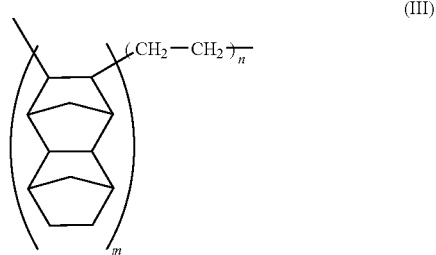

(III)

where n=m in this formula.

<Evaluation of Reflectance Characteristics>

Figure 4:
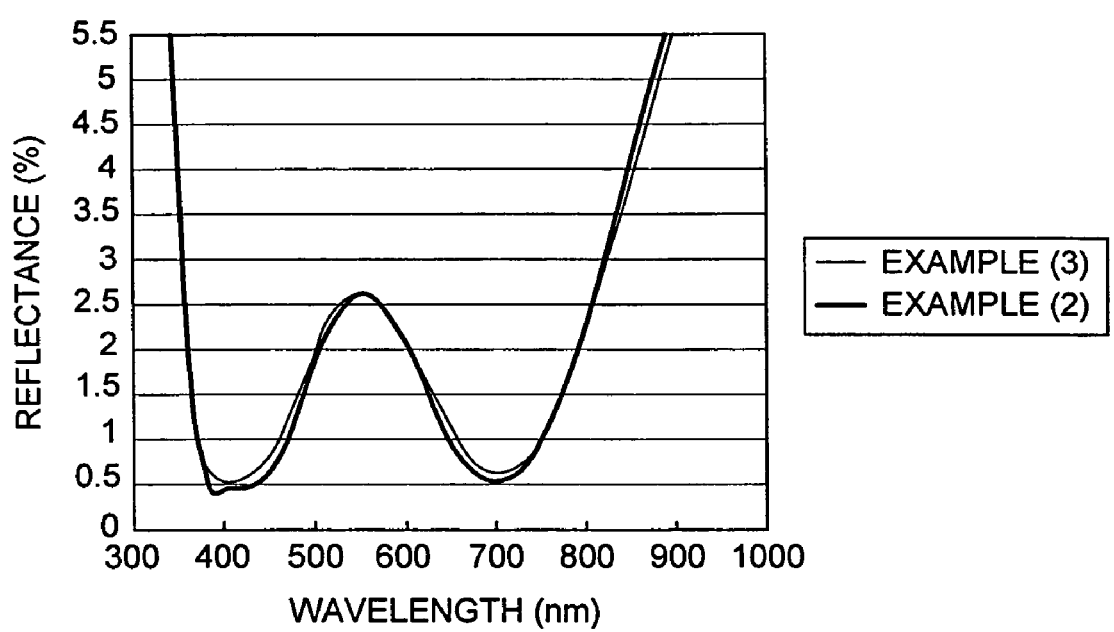
FIG. 4 shows a reflectance characteristics of the objective lens of examples (2) and (3)
Figure 6:
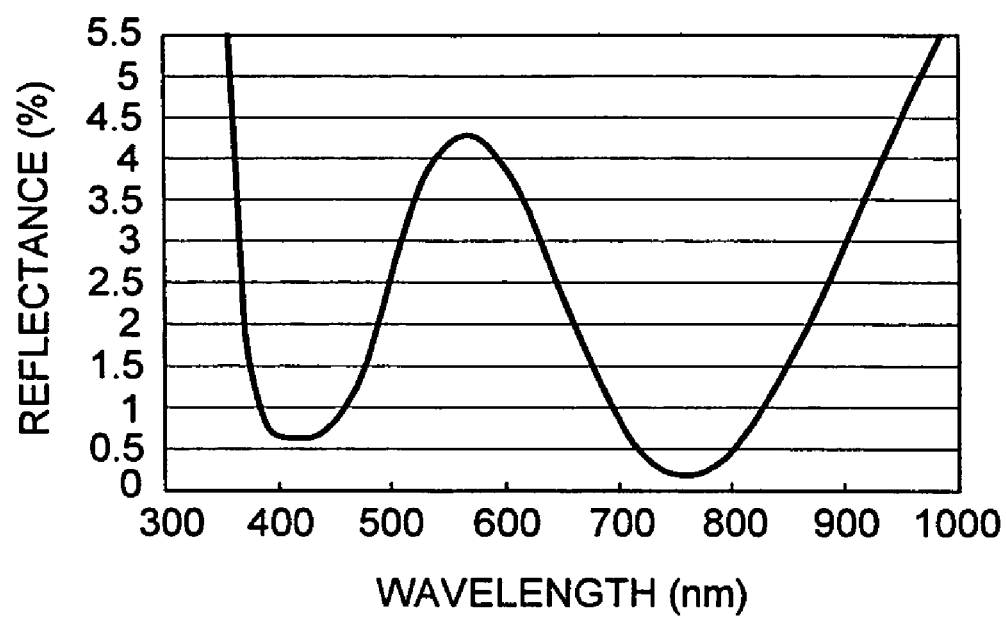
FIG. 6 shows reflectance characteristics of the objective lens of example (4)
Figure 7:
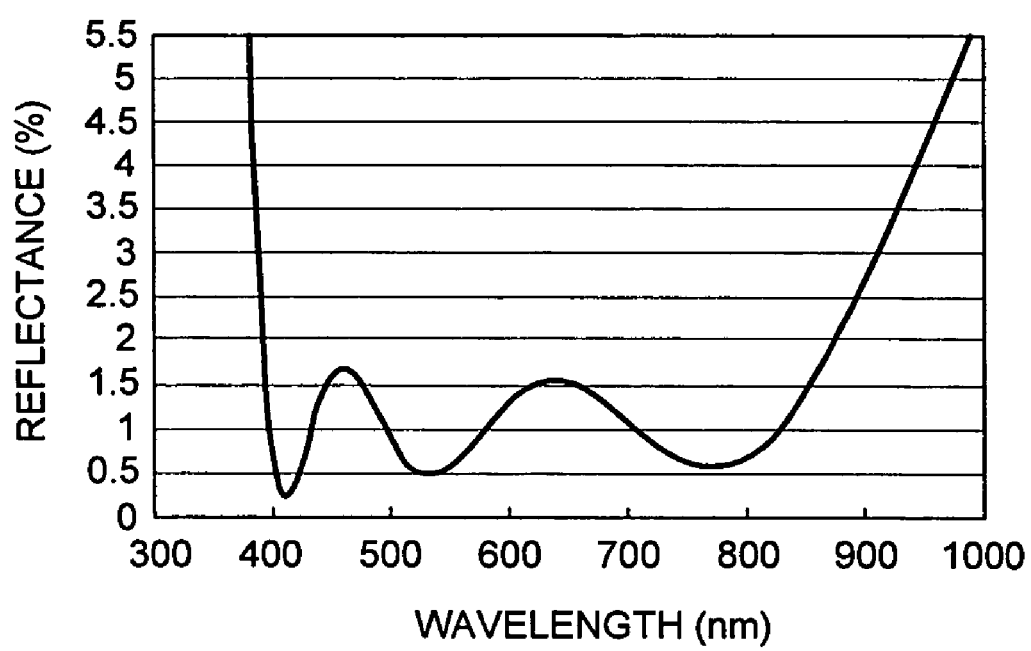
FIG. 7 shows reflectance characteristics of the objective lens of example (5)

When the reflectance characteristics of the objective lens of the examples (1)-(5) and the comparative examples (1)-(3) formed as described above were measured, the results shown in FIG. 4 were obtained. At the same time, when the reflectance characteristics of the objective lens of the example (4) and example (5) were measured, the results shown in FIGS. 6 and 7 were obtained. From this, it can be seen that preferable transmittance for light in the wavelength range of 350 nm to 450 nm, 620 nm to 680 nm, and 750 nm to 810 nm were obtained in each of these objective lens. It is to be noted that in FIG. 4, only the reflectance characteristics of examples (2) and (3) are shown for convenience, but the in the other examples provide similar reflectance characteristics.

<Evaluation of Light Stability>

The 405 nm wavelength light flux was emitted on the objective lens of the examples (1)-(5) and the comparative examples (1)-(3) so as to have a peak intensity of 120 mW/mm², and when observation was done at the points when 168 hours and 336 hours had elapsed, the results shown in Table 1 above were obtained.

From this it can be seen that the objective lens of the examples (1)-(5) and the comparative examples (1) and (3) have a greater light stability than the objective lens of comparative example (2). It is to be noted that when evaluating the light stability characteristics in Table 1, "B" indicates that even after 336 hours had elapsed, there was no peeling or cracking of the antireflection film and no changes in the optical surface. "C" indicates that after 168 hours had elapsed, there was no peeling or cracking of the antireflection film, but after 336 hours had elapsed, there was peeling.

<Evaluation of Environmental Stability>

When the objective lens of the examples (1)-(5) and the comparative examples (1)-(3) were subjected to heat stability experiments and high temperature and high humidity experiments, and the appearance observed in a room temperature environment, the results shown in Table 1 above were obtained. The heat stability experiments herein was carried out by placing the objective lens in a dry environment for 168 hours at temperatures of 80° C., 85° C., and 90° C. In addition, high temperature and high humidity experiments were carried out by placing the objective lens in an environment of temperature 60° C. and humidity 90% for 168 hours.

From this it can be seen that the objective lens of the examples (1)-(5) have a greater environmental stability than the objective lens of comparative examples (1)-(3), and in the objective lens of example (1) in particular, the environmental stability was favorable. It is to be noted that when evaluating the light stability characteristics in Table 1, "A" indicates that there was no peeling or cracking of the antireflection film in both the 90° C. heat stability experiment, and the high temperature and high humidity experiment. In addition, "B" indicates that there was no peeling or cracking of the antireflection film in both the 85° C. heat stability experiment and the high temperature and high humidity experiment, but peeling or cracking occurred in the 90° C. heat stability experiment. "C" indicates that there was no peeling or cracking of the antireflection film in both the 80° C. heat stability experiment and the high temperature and high humidity experiment, but peeling or cracking occurred in the 85° C. heat stability experiment. "D" indicates that there was peeling or cracking of the antireflection film in both the 80° C. heat stability experiment, and the high temperature and high humidity experiment.

<Overall Evaluation>

When overall evaluation of the objective lens of the examples (1)-(5) and the comparative examples (1)-(3) was performed by paying attention to whether they were suitable as the objective lens for the optical pickup apparatus based on the above results, the results shown in Table 1 were obtained.

From this it can be seen that the objective lens of the examples (1)-(5) are more suitable as the objective lens for the optical pickup apparatus than the objective lens of comparative examples (1)-(3). It is to be noted that in the Overall Evaluation of Table 1, "B" indicates that the light stability and environmental stability evaluations are "B" or "A", and thus is suitable as the objective lens for use in the optical pickup apparatus. "C" or higher indicates that the light stability and environmental stability evaluations are "C" or higher, and thus is suitable as the objective lens for use in the optical pickup apparatus. "D" indicates that one of the light stability and environmental stability is "D", and thus is unsuitable as the objective lens for use in the optical pickup apparatus.

Example 2

This invention is described in even more detail using the example and comparative examples.

<Composition of the Objective Lens>

Examples (6)-(9) and comparative examples (4) to (6) of objective lens in this embodiment are formed by providing antireflection films of the layer compositions shown in Table 11 on the optical surface of the substrate 30.

TABLE 11

| Data | Structure of Objective Lens | Structure of Lower Refractive Index Layer | Light stability | Environmental Stability | Overall Evaluation |
|---|---|---|---|---|---|
| Comparative Example (4) | Table 16 | Only $L_1$ | B | D | D |
| Comparative Example (5) | Table 17 | Only $L_3$ | B | C | C |
| Comparative Example (6) | Table 18 | Only $L_2$ | C | D | D |
| Example (6) | Table 12 | $L_1$ and $L_3$ | B | A | B |
| Example (7) | Table 13 | $L_2$ and $L_3$ | B | B | B |
| Example (8) | Table 14 | $L_1$ and $L_2$ | B | B | B |
| Example (9) | Table 15 | $L_1$ and $L_2$ and $L_3$ | B | A | B |

More specifically, the objective lens of examples (6) to (9) use the antireflection film having the layer structure shown in Table 12 to Table 15 below. In the antireflection film, the "first" layer, the "third" layer, the "fifth" layer, the "seventh" layer and the "ninth" layer are the lower refractive index layers according to the present invention and the "second" layer, the "fourth" layer, the "sixth" layer and the "eighth" layer are the higher refractive index layers according to the present invention.

The objective lens of comparative examples (4) to (6) use the antireflection film having the layer structure shown in Table 16 to Table 18 below.

TABLE 12

| Layer | Material | Refractive Index | Thickness |
|---|---|---|---|
| Medium | Air | 1 | |
| 1 | $L_1$ | 1.49 | 106 |
| 2 | $ZrO_2$ | 1.98 | 40 |
| 3 | $L_3$ | 1.52 | 31 |
| 4 | $ZrO_2$ | 1.98 | 38 |
| 5 | $L_1$ | 1.49 | 16 |
| 6 | $ZrO_2$ | 1.98 | 12 |
| 7 | $L_3$ | 1.52 | 53 |
| 8 | $ZrO_2$ | 1.98 | 12 |
| 9 | $L_1$ | 1.49 | 90 |
| Substrate | APEL | | |

TABLE 13

| Layer | Material | Refractive Index | Thickness |
|---|---|---|---|
| Medium | Air | 1 | |
| 1 | $L_2$ | 1.5 | 106 |
| 2 | $ZrO_2$ | 1.98 | 40 |
| 3 | $L_3$ | 1.52 | 31 |
| 4 | $ZrO_2$ | 1.98 | 38 |
| 5 | $L_2$ | 1.5 | 16 |
| 6 | $ZrO_2$ | 1.98 | 12 |
| 7 | $L_3$ | 1.52 | 53 |
| 8 | $ZrO_2$ | 1.98 | 12 |
| 9 | $L_2$ | 1.5 | 90 |
| Substrate | APEL | | |

TABLE 14

| Layer | Material | Refractive Index | Thickness |
|---|---|---|---|
| Medium | Air | 1 | |
| 1 | $L_1$ | 1.49 | 106 |
| 2 | $ZrO_2$ | 1.98 | 40 |
| 3 | $L_2$ | 1.5 | 31 |
| 4 | $ZrO_2$ | 1.98 | 38 |
| 5 | $L_1$ | 1.49 | 16 |
| 6 | $ZrO_2$ | 1.98 | 12 |
| 7 | $L_2$ | 1.5 | 53 |
| 8 | $ZrO_2$ | 1.98 | 12 |
| 9 | $L_1$ | 1.49 | 90 |
| Substrate | APEL | | |

TABLE 15

| Layer | Material | Refractive Index | Thickness |
|---|---|---|---|
| Medium | Air | 1 | |
| 1 | $L_1$ | 1.49 | 106 |
| 2 | $ZrO_2$ | 1.98 | 40 |
| 3 | $L_3$ | 1.52 | 31 |
| 4 | $ZrO_2$ | 1.98 | 38 |
| 5 | $L_2$ | 1.5 | 16 |
| 6 | $ZrO_2$ | 1.98 | 12 |
| 7 | $L_3$ | 1.52 | 53 |
| 8 | $ZrO_2$ | 1.98 | 12 |
| 9 | $L_1$ | 1.49 | 90 |
| Substrate | APEL | | |

TABLE 16

| Layer | Material | Refractive Index | Thickness |
|---|---|---|---|
| Medium | Air | 1 | |
| 1 | $L_1$ | 1.49 | 106 |
| 2 | $ZrO_2$ | 1.98 | 40 |
| 3 | $L_1$ | 1.49 | 31 |
| 4 | $ZrO_2$ | 1.98 | 38 |
| 5 | $L_1$ | 1.49 | 16 |
| 6 | $ZrO_2$ | 1.98 | 12 |
| 7 | $L_1$ | 1.49 | 53 |
| 8 | $ZrO_2$ | 1.98 | 12 |
| 9 | $L_1$ | 1.49 | 90 |
| Substrate | APEL | | |

TABLE 17

| Layer | Material | Refractive Index | Thickness |
|---|---|---|---|
| Medium | Air | 1 | |
| 1 | $L_2$ | 1.5 | 106 |
| 2 | $ZrO_2$ | 1.98 | 40 |
| 3 | $L_2$ | 1.5 | 31 |
| 4 | $ZrO_2$ | 1.98 | 38 |
| 5 | $L_2$ | 1.5 | 16 |
| 6 | $ZrO_2$ | 1.98 | 12 |
| 7 | $L_2$ | 1.5 | 53 |
| 8 | $ZrO_2$ | 1.98 | 12 |
| 9 | $L_2$ | 1.5 | 90 |
| Substrate | APEL | | |

TABLE 18

| Layer | Material | Refractive Index | Thickness |
|---|---|---|---|
| Medium | Air | 1 | |
| 1 | L$_3$ | 1.52 | 106 |
| 2 | ZrO$_2$ | 1.98 | 40 |
| 3 | L$_3$ | 1.52 | 31 |
| 4 | ZrO$_2$ | 1.98 | 38 |
| 5 | L$_3$ | 1.52 | 16 |
| 6 | ZrO$_2$ | 1.98 | 12 |
| 7 | L$_3$ | 1.52 | 53 |
| 8 | ZrO$_2$ | 1.98 | 12 |
| 9 | L$_3$ | 1.52 | 90 |
| Substrate | APEL | | |

It is to be noted that in Table 12 to 18, the refractive index is the refractive index for light flux with a wavelength of 450 nm.

In this example, the higher refractive index layer is formed from zirconium oxide, but it may also be formed from hafnium oxide, zirconium oxide, titanium oxide, magnesium oxide, lanthanum oxide, zirconium titanate, tantalum oxide, silicon oxide, thorium oxide, yttrium oxide, praseodymium oxide, and scandium oxide, and these may be used singly or as mixtures. Also, "L$_1$", "L$_2$" and "L$_3$" and APEL are respectively formed from the same material as in the Example 1.

<Evaluation of Reflectance Characteristics>

Figure 5:
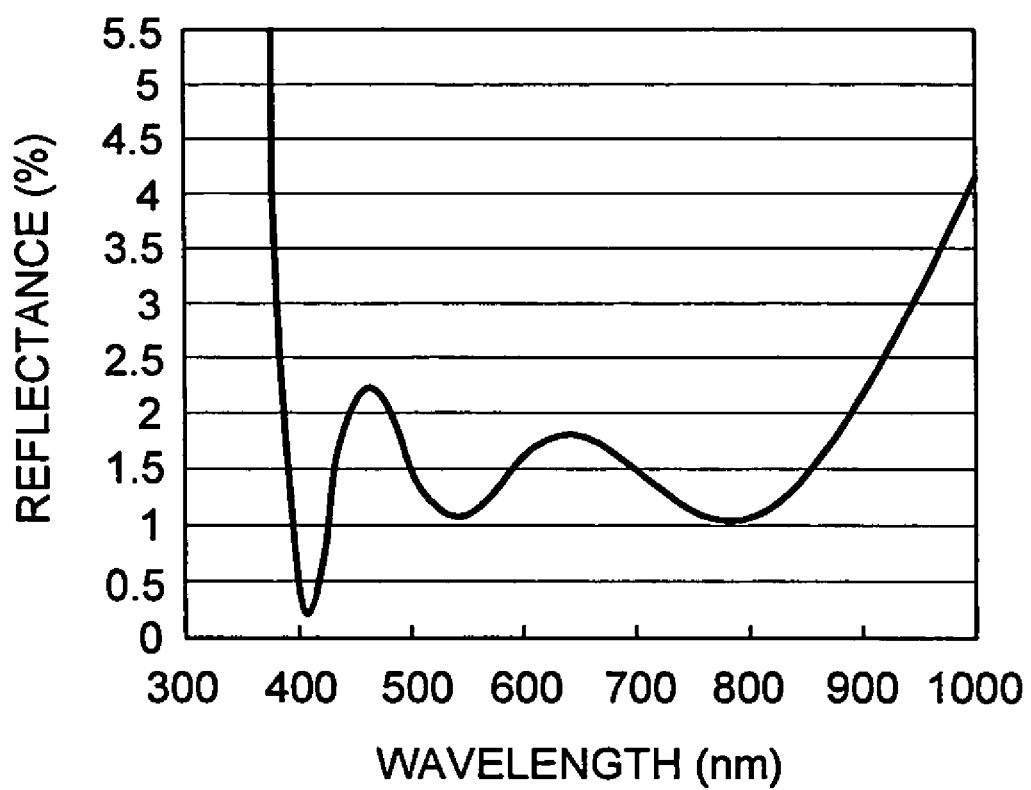
FIG. 5 shows reflectance characteristics of the objective lens of examples (6) to (9) and comparative examples (4) to (6)

When the reflectance characteristics of each of the objective lens of the examples (6)-(9) and the comparative example (4)-(6) formed as described above were measured, the results shown in FIG. 5 were obtained. From this, it can be seen that favorable transmittances for light in the wavelength range of 350 nm to 450 nm, 620 nm to 680 nm, and 750 nm to 810 nm were obtained in each of these objective lens.

<Evaluation of Light Stability>

The 405 nm wavelength light flux was emitted on the objective lens of the examples (6)-(9) and the comparative examples (4)-(6) so as to have a peak intensity of 120 mW/mm$^2$, and observation was done at the points when 168 hours and 336 hours had elapsed, and the results shown in Table 11 above were obtained.

From this it can be seen that the objective lens of the examples (6)-(9) and the comparative examples (4) and (5) have a greater light stability than the objective lens of comparative example (6).

<Evaluation of Environmental Stability>

When the objective lens of the examples (6)-(9) and the comparative examples (4)-(6) were subjected to heat stability experiments and high temperature and high humidity experiments like those of the example 1, and the appearance observed in a room temperature environment, the results shown in Table 9 above were obtained.

From this it can be seen that the objective lens of the examples (6)-(9) have greater environmental stability than the objective lens of comparative examples (4)-(6), and in the objective lens of example (4) and (7) in particular, the environmental stability was favorable.

<Overall Evaluation>

When overall evaluation of the objective lens of the examples (6)-(9) and the comparative examples (4)-(6) was performed by paying attention to whether they were suitable as the objective lens for the optical pickup apparatus based on the above results, the results shown in Table 11 were obtained.

From this it can be seen that the objective lens of the example (6)-(9) are more suitable as the objective lens for the optical pickup apparatus than the objective lens of comparative examples (4)-(6).

What is claimed is:

1. An optical element comprising:
   a substrate; and
   an antireflection film formed on a surface of the substrate comprising:
   a plurality of lower refractive index layers having a refractive index equal to or more than 1.4 and equal to or less than 1.6 for a light flux with a wavelength of 450 mm; and
   a plurality of higher refractive index layers having a refractive index equal to or more than 1.8 and equal to or less than 2.2 for a light flux with a wavelength of 450 nm,
   wherein the plurality of lower refractive index layers and the plurality of higher refractive index layers are layered alternately,
   each of the plurality of the lower refractive index layers comprises a main component, and
   at least two of the plurality of the lower refractive index layers comprise a side component, and
   percentages for the side component in at least two of the plurality of the lower refractive index layers are different, and
   each of the plurality of the high refractive index layer adjoins at least one lower refractive index layer comprising a side component.

2. The optical element of claim 1,
   wherein the optical element is arranged on an optical path of an optical pickup apparatus for recording and/or reproducing information using a light flux emitted by a light source.

3. The optical element of claim 2,
   wherein the optical element converges at last a light flux with a single wavelength in a range of 350 nm to 450 nm on an information recording medium.

4. The optical element of claim 1, wherein the main component is silicon dioxide.

5. The optical element of claim 1, wherein the side component is aluminum oxide.

6. The optical element of claim 1, wherein each of the plurality of the higher refractive index layers comprises a substance or a mixture of substances selected from a group consisting of: hafnium oxide, zirconium oxide, titanium oxide, magnesium oxide, lanthanum oxide, zirconium titanate, tantalum oxide, silicon oxide, thorium oxide, yttrium oxide, praseodymium oxide, and scandium oxide.

7. The optical element of claim 6, wherein each of the plurality of the higher refractive index layers comprises zirconium oxide.

8. The optical element of claim 1, wherein the antireflection layer is formed of 7, 8 or 9 layers.

9. The optical element of claim 1, wherein the substrate comprises a resin composition comprising
   a resin comprising a copolymer of an α-olefin and a cyclic olefin; and
   a light stabilizer, and
   the cyclic olefin is represented by general formula (I) or general formula (II),
   where in the general formula (I), n is 0 or 1, m is 0 or a positive integer, k is 0 or 1, and each of $R^1$ to $R^{18}$, $R^a$, and $R^b$ independently represents hydrogen atom, halogen atom, or hydrocarbon group and
   where in the general formula (II), each of p and q is 0 or a positive integer independently, each of r and s is one of 0, 1, and 2 independently, each of $R^{21}$ to $R^{39}$ represent independently hydrogen atom, halogen atom, hydrocarbon group, or alkoxy group.

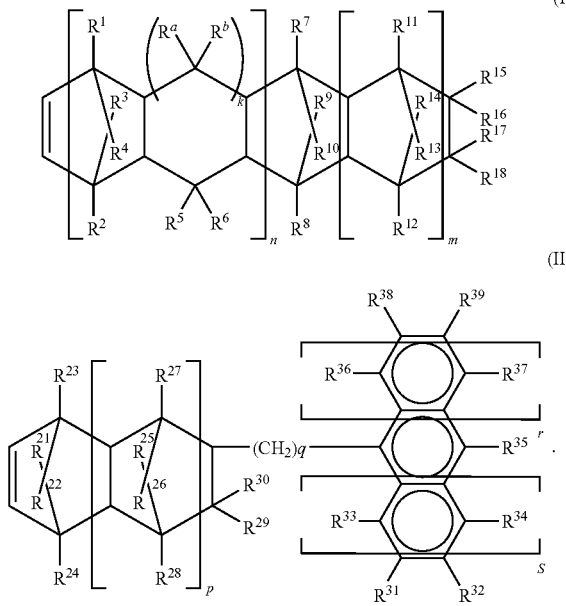

10. The optical element of claim 9, wherein the light stabilizer is a hindered amine light stabilizer.

11. An optical element, comprising:
a substrate; and
an antireflection film formed on a surface of the substrate comprising:
a plurality of lower refractive index layers having a refractive index equal to or more than 1.4 and equal to or less than 1.6 for a light flux with a wavelength of 450 nm, and
a plurality of higher refractive index layers having a refractive index equal to or more than 1.8 and equal to or less than 2.2 for a light flux with a wavelength of 450 nm,
wherein the plurality of lower refractive index layers and the plurality of higher refractive index layers are layered alternately, and
each of the plurality of the lower refractive index layers comprises an identical main component, at least two of the plurality of the lower refractive index layers comprise a side component, and
percentages for the side component in at least two of the plurality of the lower refractive index layers are different,
wherein the antireflection layer comprises:
a first layer arranged at a closest position to the substrate and having a layer thickness in a range of 100 nm to 130 nm;
a second layer arranged at a second closest position to the substrate and having a layer thickness in a range of 10 nm to 14 nm;
a third layer arranged at a third closest position to the substrate and having a layer thickness in a range of 28 nm to 36 nm;
a fourth layer arranged at a fourth closest position to the substrate and having a layer thickness in a range of 46 nm to 60 nm;
a fifth layer arranged at a fifth closest position to the substrate and having a layer thickness in a range of 13 nm to 17 nm;
a sixth layer arranged at a sixth closest position to the substrate and having a layer thickness in a range of 44 nm to 55 nm; and
a seventh layer arranged at a seventh closest position to the substrate and having a layer thickness in a range of 75 nm to 95 nm.

12. An optical element comprising:
a substrate; and
an antireflection film formed on a surface of the substrate comprising
a plurality of lower refractive index layers having a refractive index equal to or more than 1.4 and equal to or less than 1.6 for a light flux with a wavelength of 450 nm, and
a plurality of higher refractive index layers having a refractive index equal to or more than 1.8 and equal to or less than 2.2 for a light flux with a wavelength of 450 nm,
wherein the plurality of lower refractive index layers and the plurality of higher refractive index layers are layered alternately, and
each of the plurality of the lower refractive index layers comprises an identical main component, at least two of the plurality of the lower refractive index layers comprise a side component, and
percentages for the side component in at least two of the plurality of the lower refractive index layers are different,
wherein the antireflection layer comprises:
a first layer arranged at a closest position to the substrate and having a layer thickness in a range of 85 nm to 105 nm;
a second layer arranged at a second closest position to the substrate and having a layer thickness in a range of 11 nm to 15 nm;
a third layer arranged at a third closest position to the substrate and having a layer thickness in a range of 30 nm to 38 nm;
a fourth layer arranged at a fourth closest position to the substrate and having a layer thickness in a range of 54 nm to 68 nm;
a fifth layer arranged at a fifth closest position to the substrate and having a layer thickness in a range of 20 nm to 25 nm;
a sixth layer arranged at a sixth closest position to the substrate and having a layer thickness in a range of 34 nm to 43 nm; and
a seventh layer arranged at a seventh closest position to the substrate and having a layer thickness in a range of 85 nm to 108 nm.

13. An optical element comprising:
a substrate; and
an antireflection film formed on a surface of the substrate comprising:
a plurality of lower refractive index layers having a refractive index equal to or more than 1.4 and equal to or less than 1.6 for a light flux with a wavelength of 450 nm and
a plurality of higher refractive index layers having a refractive index equal to or more than 1.8 and equal to or less than 2.2 for a light flux with a wavelength of 450 nm,
wherein the plurality of lower refractive index layers and the plurality of higher refractive index layers are layered alternately, and each of the plurality of the lower refractive index layers comprises an identical main component, at least two of the plurality of the lower refractive index layers comprise a side component, and percentages for the side component in at least two of the plurality of the lower refractive index layers are different, wherein the antireflection layer comprises:

a first layer arranged at a closest position to the substrate and having a layer thickness in a range of 100 nm to 130 nm;

a second layer arranged at a second closest position to the substrate and having a layer thickness in a range of 13 nm to 17 nm;

a third layer arranged at a third closest position to the substrate and having a layer thickness in a range of 42 nm to 52 nm;

a fourth layer arranged at a fourth closest position to the substrate and having a layer thickness in a range of 50 nm to 63 nm;

a fifth layer arranged at a fifth closest position to the substrate and having a layer thickness in a range of 13 nm to 17 nm;

a sixth layer arranged at a sixth closest position to the substrate and having a layer thickness in a range of 52 nm to 65 nm; and a seventh layer arranged at a seventh closest position to the substrate and having a layer thickness in a range of 85 nm to 108 nm.

14. An optical element comprising:

a substrate; and an antireflection film formed on a surface of the substrate comprising a plurality of lower refractive index layers having a refractive index equal to or more than 1.4 and equal to or less than 1.6 for a light flux with a wavelength of 450 nm, and a plurality of higher refractive index layers having a refractive index equal to or more than 1.8 and equal to or less than 2.2 for a light flux with a wavelength of 450 nm, wherein the plurality of lower refractive index layers and the plurality of higher refractive index layers are layered alternately, and each of the plurality of the lower refractive index layers comprises an identical main component, at least two of the plurality of the lower refractive index layers comprise a side component, and percentages for the side component in at least two of the plurality of the lower refractive index layers are different, wherein the antireflection layer comprises:

a first layer arranged at a closest position to the substrate and having a layer thickness in a range of 80 nm to 100 nm;

a second layer arranged at a second closest position to the substrate and having a layer thickness in a range of 10 nm to 14 nm;

a third layer arranged at a third closest position to the substrate and having a layer thickness in a range of 46 nm to 58 nm;

a fourth layer arranged at a fourth closest position to the substrate and having a layer thickness in a range of 10 nm to 14 nm;

a fifth layer arranged at a fifth closest position to the substrate and having a layer thickness in a range of 14 nm to 18 nm;

a sixth layer arranged at a sixth closest position to the substrate and having a layer thickness in a range of 33 nm to 42 nm;

a seventh layer arranged at a seventh closest position to the substrate and having a layer thickness in a range of 27 nm to 35 nm;

a eighth layer arranged at a eighth closest position to the substrate and having a layer thickness in a range of 35 nm to 45 nm; and a ninth layer arranged at a ninth closest position to the substrate and having a layer thickness in a range of 94 nm to 117 nm.

15. An optical pickup apparatus, comprising:

a first light source for emitting a first light flux;

an objective lens for converging the first light flux emitted from the first light flux to an information recording medium; and an optical element arranged on an optical path of the first light flux, wherein the optical element comprises:

a substrate; and an antireflection film formed on a surface of the substrate comprising a plurality of lower refractive index layers having a refractive index equal to or more than 1.4 and equal to or less than 1.6 for a light flux with a wavelength of 450 nm, and a plurality of higher refractive index layers having a refractive index equal to or more than 1.8 and equal to or less than 2.2 for a light flux with a wavelength of 450 nm, the plurality of lower refractive index layers and the plurality of higher refractive index layers are layered alternately, and each of the plurality of the lower refractive index layers comprises a main component, and each of the plurality of the lower refractive index layers comprises a main component, at least two of the plurality of the lower refractive index layers comprise a side component, and percentages for the side component in at least two of the plurality of the lower refractive index layers are different, and each of the plurality of the high refractive index layer adjoins at least one lower refractive index layer comprising a side component.

16. The optical pickup apparatus of claim 15, wherein the optical element is the objective lens.

17. The optical pickup apparatus of claim 15, wherein the first light source emits a light flux with a single wavelength in a range of 350 nm to 450 nm.

* * * * *